United States Patent
Dudar et al.

(10) Patent No.: US 11,274,622 B1
(45) Date of Patent: Mar. 15, 2022

(54) METHODS AND SYSTEMS FOR DIAGNOSING FUEL SYSTEM DEGRADATION

(71) Applicant: Ford Global Technologies, LLC, Dearborn, MI (US)

(72) Inventors: Aed Dudar, Canton, MI (US); Dennis Yang, Canton, MI (US); Russell Randall Pearce, Ann Arbor, MI (US); Daniel Frank Cragel, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/098,085

(22) Filed: Nov. 13, 2020

(51) Int. Cl.
  *F02D 41/22* (2006.01)
  *F02D 41/00* (2006.01)
  *F02M 37/00* (2006.01)

(52) U.S. Cl.
  CPC .......... *F02D 41/22* (2013.01); *F02D 41/003* (2013.01); *F02M 37/0082* (2013.01); *F02D 2041/225* (2013.01); *F02D 2200/0625* (2013.01)

(58) Field of Classification Search
  CPC .. F02D 41/003; F02D 41/22; F02D 2041/225; F02D 2200/0625; F02M 37/0082
  See application file for complete search history.

(56) References Cited

U.S. PATENT DOCUMENTS

| | | | |
|---|---|---|---|
| 3,693,825 A * | 9/1972 | Richman | B60K 15/03504 220/227 |
| 4,880,135 A | 11/1989 | Neou | |
| 5,925,817 A * | 7/1999 | Kidokoro | B60K 15/03 73/40 |
| 6,626,157 B2 * | 9/2003 | Perry | F02M 25/0809 123/516 |
| 6,681,789 B1 | 1/2004 | Moulis et al. | |
| 8,074,627 B2 | 12/2011 | Siddiqui | |
| 2011/0139130 A1 | 6/2011 | Siddiqui | |

* cited by examiner

*Primary Examiner* — Hung Q Nguyen
*Assistant Examiner* — Mark L. Greene
(74) *Attorney, Agent, or Firm* — Geoffrey Brumbaugh; McCoy Russell LLP

(57) ABSTRACT

Methods and systems are provided for diagnosing leaks in a fuel system. In one example, a method may include monitoring a fuel level in a vehicle fuel tank of the fuel system during refueling and indicating degradation of the vehicle fuel tank and/or a bellows coupled to the vehicle fuel tank based on the monitored fuel level. In some examples, indicating the degradation may further be based on a rate of fuel supplied to the vehicle fuel tank during the refueling and/or a vehicle fuel economy. In this way, degradation to the vehicle fuel tank and the bellows may be passively determined with minimal specialized components in the fuel system.

20 Claims, 9 Drawing Sheets

METHODS AND SYSTEMS FOR DIAGNOSING FUEL SYSTEM DEGRADATION

FIELD

The present description relates generally to methods and systems for diagnosing degradation in a fuel system, and particularly for detecting leaks in a fuel tank and/or a bellows included therein.

BACKGROUND/SUMMARY

Vehicles, such as plug-in hybrid electric vehicles (PHEVs), may include a fuel system in which a fuel tank may be fluidically coupled to a fuel vapor canister for storing, filtering, and venting fuel vapors from the fuel tank. The fuel tank may be isolatable from the fuel vapor canister via actuation of a fuel tank isolation valve (FTIV) such that only fuel vapors from select events may be present in a given volume (e.g., the fuel tank or the fuel vapor canister). For example, the fuel tank may trap diurnal fuel vapors (that is, from diurnal temperature cycles) and "running loss" fuel vapors (that is, from fuel vaporized during vehicle operation), and the fuel vapor canister may adsorb depressurization fuel vapors (that is, fuel vapors depressurized from the fuel tank to prevent overpressure) and refueling fuel vapors (that is, fuel vapors diverted during refilling of the fuel tank). Further, when a pressure gradient is generated due to a relatively low pressure in either an intake manifold of the vehicle or the fuel tank, fuel vapors may be passively purged from the fuel vapor canister.

Such fuel systems are sometimes referred to as non-integrated refueling canister-only systems (NIRCOSs). To control the various venting and flow paths for the fuel vapors during different modes of vehicle operation, actuation of complex valve and locking systems (including the FTIV) may be enabled such that no single volume in the NIRCOS is overwhelmed with excess fuel vapor pressure and that any such excess fuel vapor pressure is carefully evacuated. To ensure component reliability in extreme fuel vapor pressure scenarios (e.g., excess fuel vapor pressure or excess vacuum), components of the fuel system may be specially reinforced. For example, the fuel tank may be constructed from heavy steel and may include a number of standoffs supporting opposing walls of the fuel tank. To further mitigate component degradation, depressurization or venting of the fuel tank and/or the fuel vapor canister may be executed on a timescale ranging from a few seconds to a few minutes (e.g., depending on ambient conditions). Particularly lengthy depressurization/venting may result in operator frustration or confusion, as the excess fuel vapor pressure must be evacuated prior to opening a refueling inlet to the atmosphere.

Other attempts at reducing fuel tank depressurization time include constructing fuel system components which are in equilibrium with a surrounding environment (e.g., one or more fuel system components may be maintained at near atmospheric pressure). Example approaches are shown by Siddiqui in U.S. Pat. No. 8,074,627; Neou in U.S. Pat. No. 4,880,135; and Moulis et al. in U.S. Pat. No. 6,681,789. Each of Siddiqui, Neou, and Moulis et al. propose maintaining fuel tank pressure with an expandable bladder or bellows system, whereby either excess fuel or excess fuel vapors may be evacuated from a fuel tank such that a fuel tank pressure may be controlled.

However, the inventors herein have recognized potential issues with such systems. For instance, implementing a fuel tank bellows to maintain acceptable fuel vapor pressures may permit simplification of a fuel system by reducing an overall number of components, as many valves and venting lines typically provided to control for excess fuel vapor pressure may be omitted. Further, with less extreme fuel vapor pressures, an increased number of options may be available for construction of the fuel tank (e.g., a less robust material may be selected for forming the fuel tank, fewer or no standoffs may be used, etc.). However, by removing those aspects of the fuel system designed to ensure that components thereof continue to operate as expected, any malfunctioning component may prove particularly detrimental to an overall reliability of the fuel system.

In one example, the issues described above may be addressed by a method including, upon initiation of refueling of a vehicle fuel tank, monitoring a fuel level in the vehicle fuel tank through completion of the refueling, and indicating degradation of a bellows coupled to the vehicle fuel tank based on the monitored fuel level. In this way, a degradation state of the bellows may be passively monitored without additional sensors and other specialized components beyond what is already provided in a vehicle.

As one example, the method may be implemented on non-transitory memory of a controller, the controller configured to receive feedback indicative of the fuel level from a fuel level sensor in the vehicle fuel tank. The controller may further receive a signal indicative of a rate of fuel being supplied during the refueling, e.g., from an external fuel pump. The monitored fuel level may be compared to a fuel level expected based on the rate of fuel being supplied. Deviations of the monitored fuel level from the expected fuel level may be indicative of a leak in the bellows or the vehicle fuel tank. In some examples, a location and/or a size of the leak may be inferred based on specific aspects of the deviations (e.g., when, and at what rate, an apparent fuel loss appears may indicate whether a leak in the bellows is small or large, and whether the leak is in a side or a base of the bellows) and a fuel economy determined following the refueling (e.g., poor fuel economy may indicate that a leak which initially appears to be in the bellows is actually in the vehicle fuel tank). Responsive to the leak being identified, a vehicle operator may be notified and/or one or more engine operating parameters may be altered to actively maintain a fuel vapor pressure of the vehicle fuel tank. In this way, the method may effectively identify, locate, and address leaks in both the vehicle fuel tank and the bellows, thereby ensuring that a vehicle fuel system including the vehicle fuel tank and the bellows functions as expected and desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
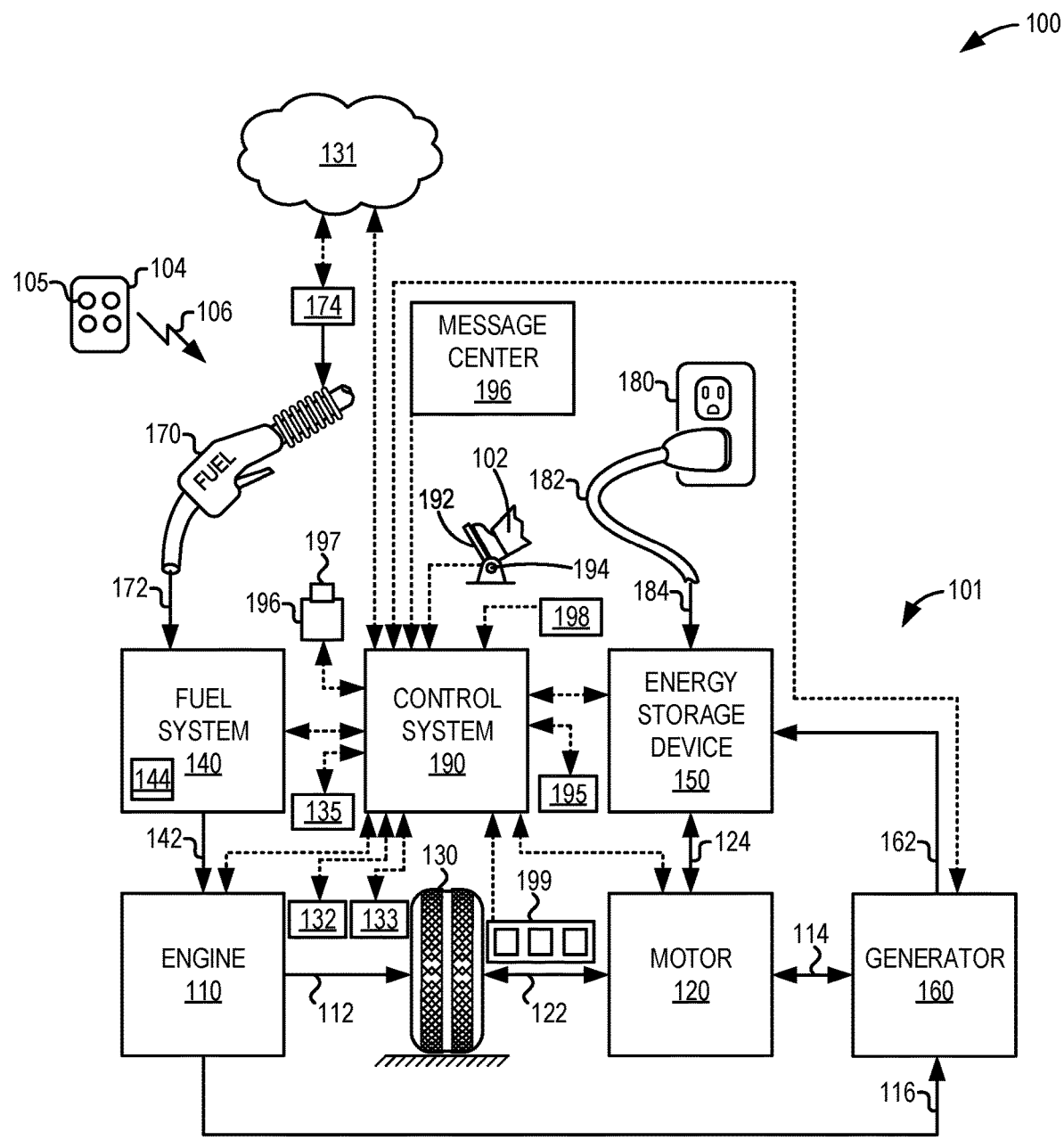
FIG. 1 shows a high-level block diagram illustrating an example vehicle system.
Figure 2:
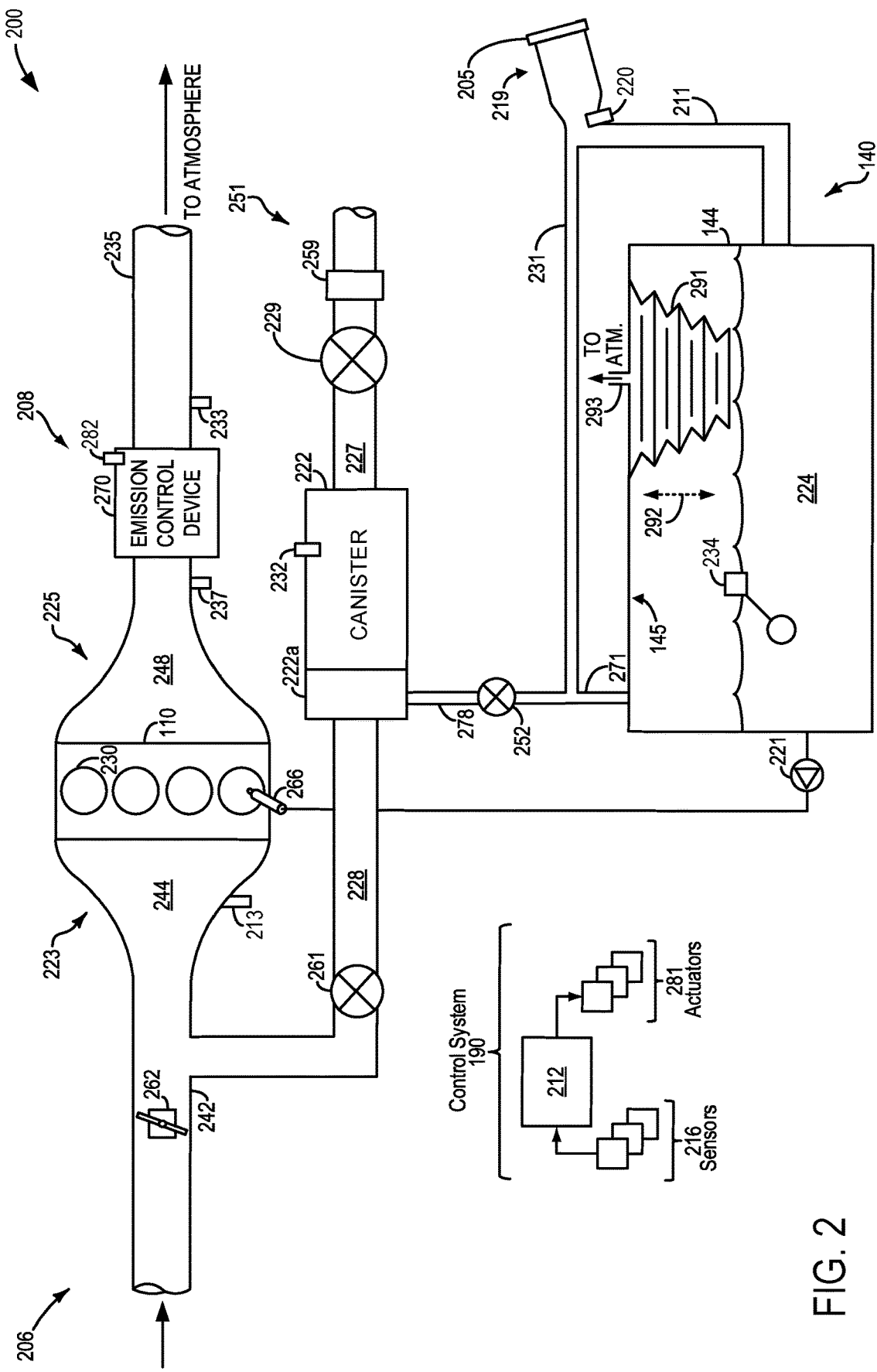
FIG. 2 shows a schematic diagram of a portion of the example vehicle system of FIG. 1, the portion of the example vehicle system including a fuel system.
Figure 5:
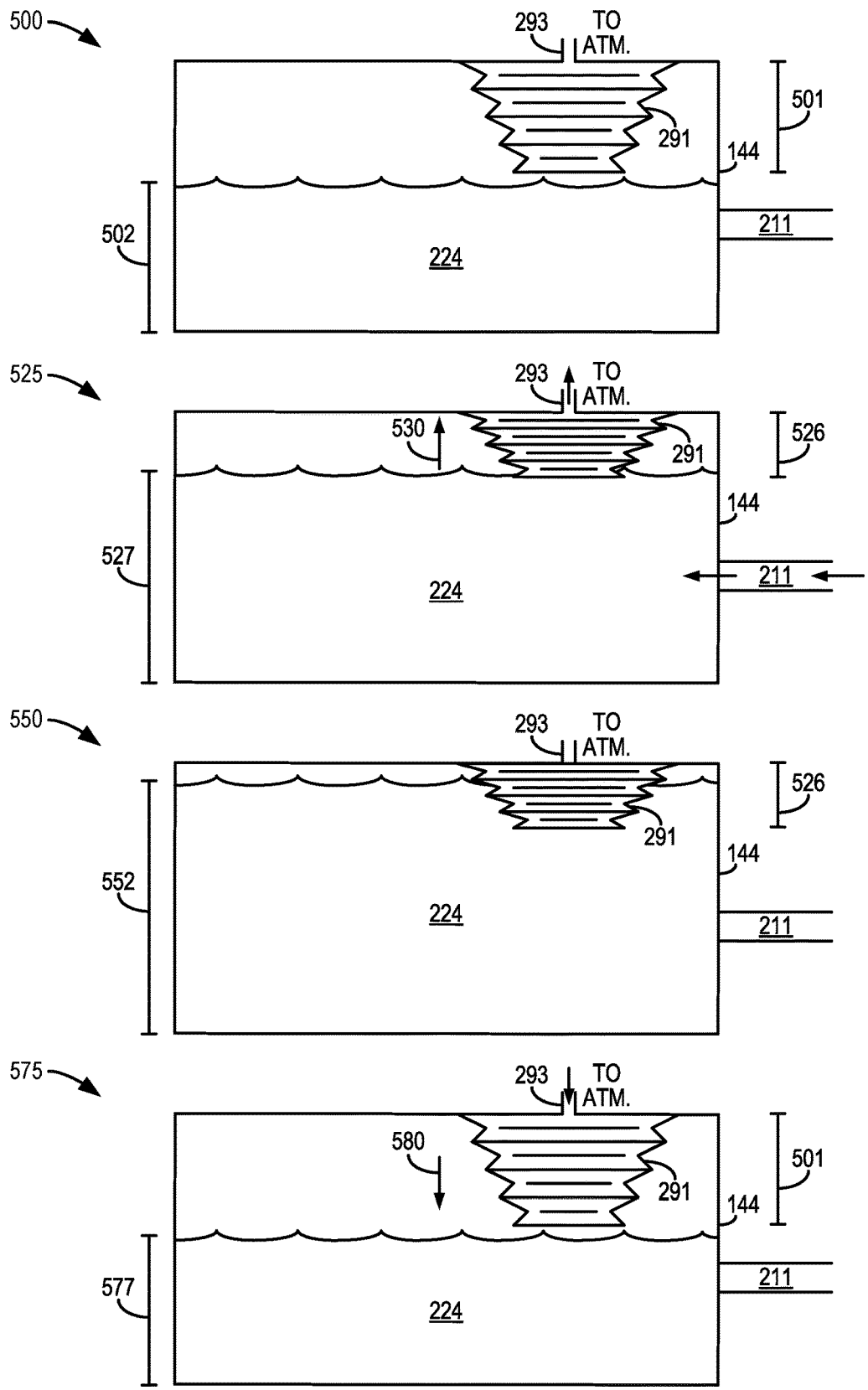
FIG. 5 shows schematic diagrams of the bellows of the fuel system in a first exemplary degradation state, specifically where the bellows is not degraded.
Figure 6:
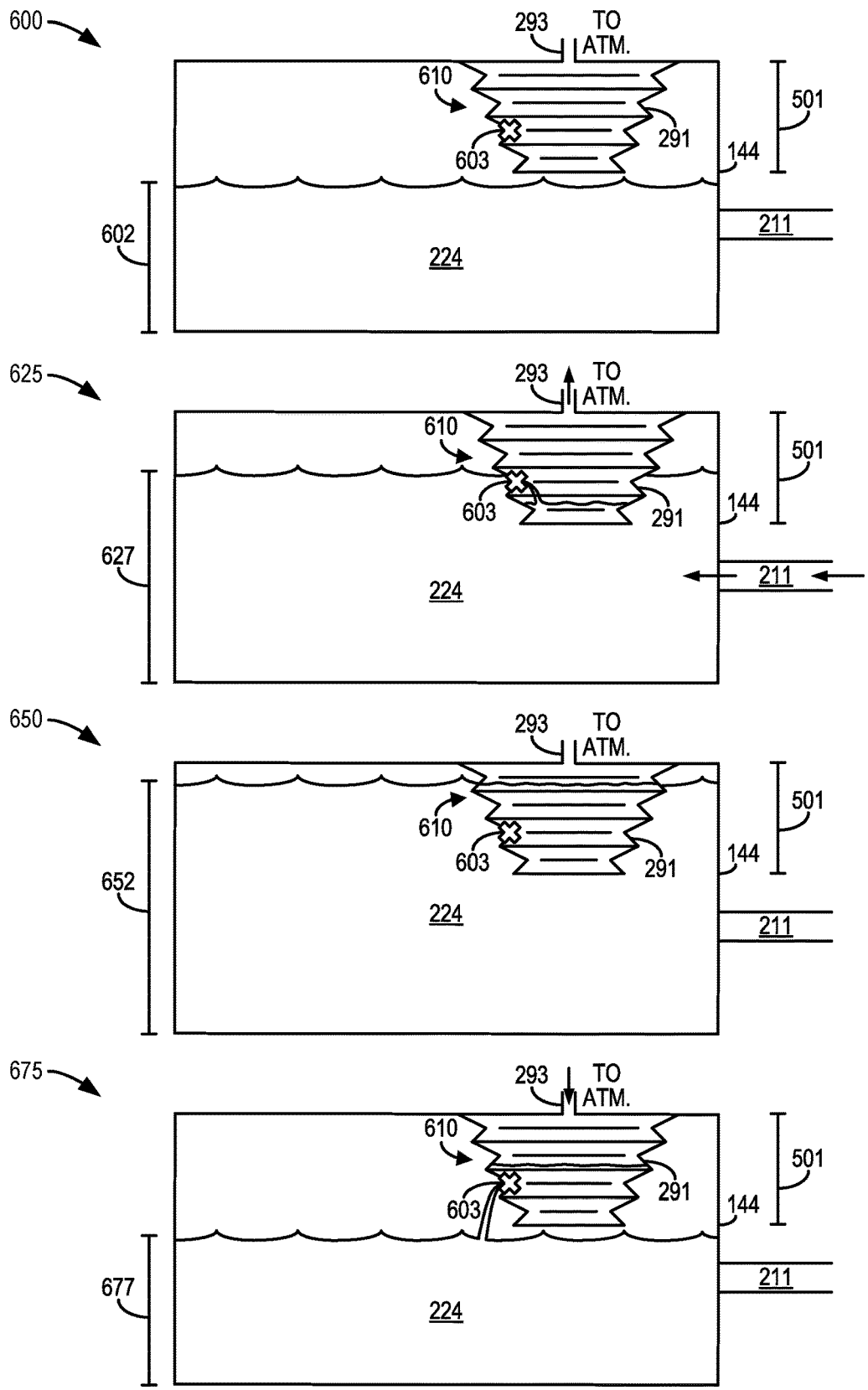
FIG. 6 shows schematic diagrams of the bellows of the fuel system in a second exemplary degradation state, specifically where a side of the bellows is ruptured.
Figure 7:
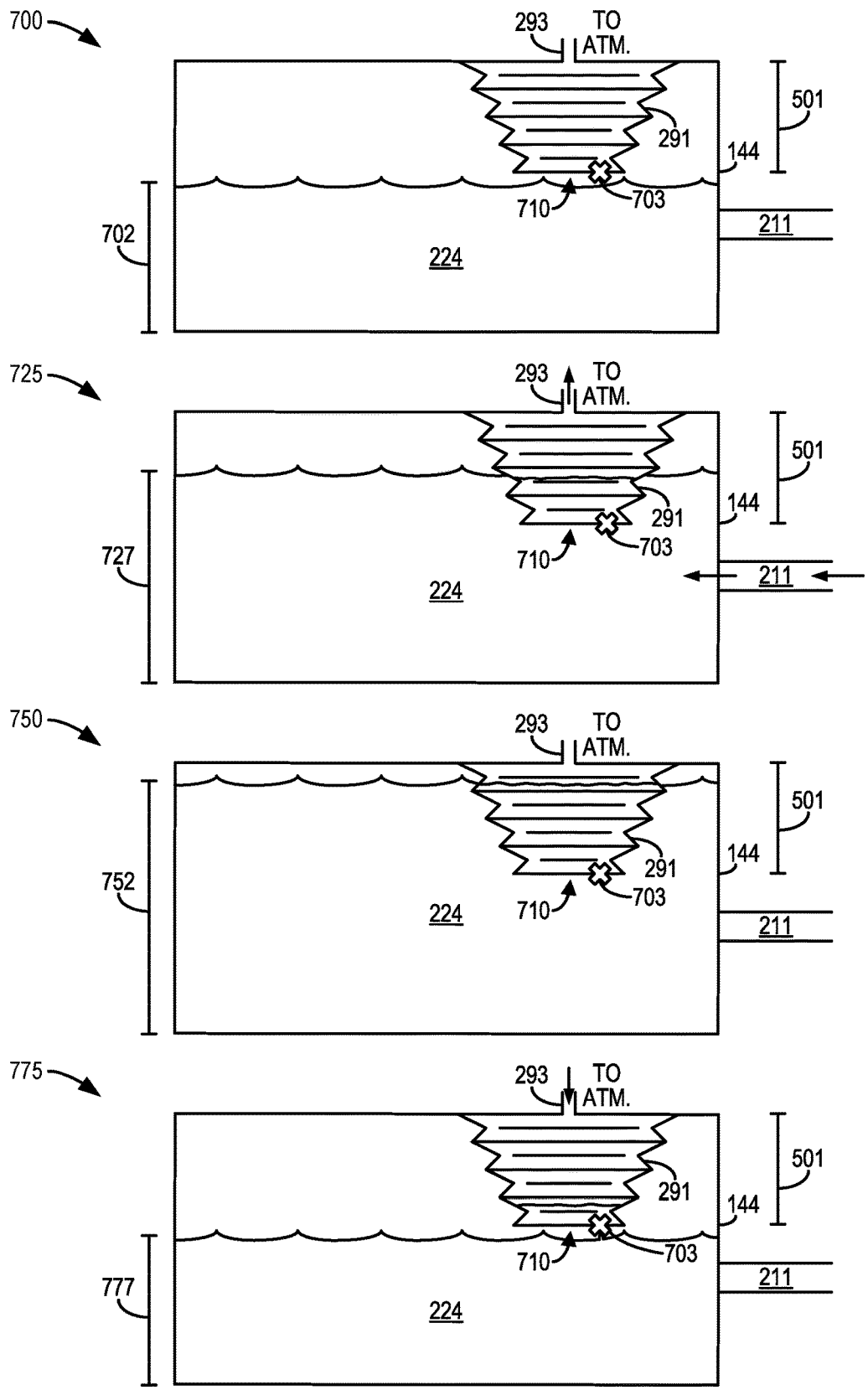
FIG. 7 shows schematic diagrams of the bellows of the fuel system in a third exemplary degradation state, specifically where a base of the bellows is ruptured.

The following description relates to methods and systems for diagnosing degradation of components of a fuel system coupled to an engine, such as the fuel system and the engine included in the vehicle system of FIGS. 1 and 2. A control routine may be implemented at a controller included in the vehicle system, the controller configured to notify a vehicle operator of a degraded fuel system and adjust one or more engine operating parameters to mitigate deleterious effects of the degraded fuel system. For example, the control routine may include the methods depicted at FIGS. 3-4B for diagnosing a leak in a fuel tank, or a bellows included in the fuel tank, of the fuel system. The diagnosis may be determined based on each of a fuel level of the fuel tank and an amount/rate of fuel supplied to the fuel tank during a refueling event, as well as a fuel economy following the refueling event. As examples, FIGS. 5-7 schematically depict the bellows in various states of degradation. Further, the plot of FIG. 8 includes five exemplary fueling curves for the bellows in respective states of degradation before, during, and after the refueling event.

Referring now to FIG. 1, a high-level block diagram 100 depicting an example vehicle propulsion system 101 is shown. Vehicle propulsion system 101 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. In such an example, a vehicle with vehicle propulsion system 101 may be referred to as a hybrid electric vehicle (HEV).

Vehicle propulsion system 101 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via one or more drive wheels 130 (as indicated by an arrow 122) while engine 110 is deactivated.

During other operating conditions, engine 110 may be set to a deactivated state (as described above) while motor 120 may be operated to charge an energy storage device 150. For example, motor 120 may receive wheel torque from drive wheel(s) 130 (as indicated by arrow 122), where the motor may convert the kinetic energy of the vehicle to electrical energy for storage at an energy storage device 150 (as indicated by an arrow 124). This operation may be referred to as regenerative braking of the vehicle. Thus, motor 120 can provide a generator function in some examples. However, in other examples, a generator 160 may instead receive wheel torque from drive wheel(s) 130, where the generator may convert the kinetic energy of the vehicle to electrical energy for storage at energy storage device 150 (as indicated by an arrow 162).

During still other operating conditions, engine 110 may be operated by combusting fuel received from a fuel system 140 (as indicated by an arrow 142). For example, engine 110 may be operated to propel the vehicle via drive wheel(s) 130 (as indicated by an arrow 112) while motor 120 is deactivated. During other operating conditions, both engine 110 and motor 120 may each be operated to propel the vehicle via drive wheel(s) 130 (as indicated by arrows 112 and 122, respectively). A configuration where both engine 110 and motor 120 may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 101 may be configured as a series type vehicle propulsion system, whereby engine 110 does not directly propel drive wheel(s) 130. Rather, engine 110 may be operated to power motor 120, which may in turn propel the vehicle via drive wheel(s) 130 (as indicated by arrow 122). For example, during select operating conditions, engine 110 may drive generator 160 (as indicated by an arrow 116), which may in turn supply electrical energy to one or more of motor 120 (as indicated by an arrow 114) and energy storage device 150 (as indicated by arrow 162). As another example, engine 110 may be operated to drive motor 120 which may in turn provide a generator function to convert engine output to electrical energy, where the electrical energy may be stored at energy storage device 150 for later use by motor 120.

Fuel system 140 may include one or more fuel tanks 144 for storing fuel onboard the vehicle. For example, fuel tank 144 may store one or more liquid fuels, including but not limited to gasoline, diesel, and alcohol fuels. In some examples, the fuel may be stored onboard the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 (as indicated by arrow 142). Still other suitable fuels or fuel blends may be supplied to engine 110, where they may be combusted at engine 110 to produce the engine output. The engine output may be utilized to propel the vehicle (e.g., via drive wheel(s) 130, as indicated by arrow 112) or to recharge energy storage device 150 via motor 120 or generator 160.

In some examples, energy storage device 150 may be configured to store electrical energy that may be supplied to other electrical loads residing onboard the vehicle (other than motor 120), including cabin heating and air conditioning, engine starting, headlights, cabin audio and video systems, etc. As a non-limiting example, energy storage device 150 may include one or more batteries and/or capacitors.

A control system 190 may communicate at least with one or more of engine 110, motor 120, fuel system 140, energy storage device 150, and generator 160. Specifically, control system 190 may receive sensory feedback information at least from one or more of engine 110, motor 120, fuel system 140, energy storage device 150, and generator 160. Further, control system 190 may send control signals at least to one or more of engine 110, motor 120, fuel system 140, energy storage device 150, and generator 160 responsive to the sensory feedback information. Control system 190 may receive an indication of an operator requested output of vehicle propulsion system 101 from a vehicle operator 102. For example, control system 190 may receive sensory feedback from a pedal position sensor 194 which communicates with a pedal 192. Pedal 192 may refer schematically to a brake pedal and/or an accelerator pedal. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone or smartphone based system where a cellular telephone or smartphone (e.g., operated by vehicle operator 102) may send data to a server and the server may communicate with the vehicle (e.g., via a wireless network 131) to start engine 110.

Energy storage device 150 may periodically receive electrical energy from a power source 180 residing external to the vehicle, e.g., not part of the vehicle (as indicated by an arrow 184). As a non-limiting example, vehicle propulsion system 101 may be configured as a plug-in HEV (PHEV), whereby electrical energy may be supplied to energy storage device 150 from power source 180 via an electrical energy transmission cable 182. During a recharging operation of energy storage device 150 from power source 180, electrical energy transmission cable 182 may electrically couple energy storage device 150 to power source 180. When vehicle propulsion system 101 is subsequently operated to propel the vehicle, electrical energy transmission cable 182 may be disconnected between power source 180 and energy storage device 150. Control system 190 may identify and/or control an amount of electrical energy stored at energy storage device 150, which may be referred to as a state of charge (SOC).

In other examples, electrical energy transmission cable 182 may be omitted, and electrical energy may instead be received wirelessly at energy storage device 150 from power source 180. For example, energy storage device 150 may receive electrical energy from power source 180 via one or more of electromagnetic induction, radio waves, and electromagnetic resonance. More broadly, any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle (e.g., during a refueling event). As a non-limiting example, vehicle propulsion system 101 may be refueled by receiving fuel via a fuel dispensing device 170 (as indicated by an arrow 172), the fuel dispensing device being supplied with fuel by an external fuel pump 174. In some examples, fuel tank 144 may be configured to store the fuel received from fuel dispensing device 170 until the fuel is supplied to engine 110 for combustion. In some examples, control system 190 may receive an indication of a level of the fuel stored at fuel tank 144 (also referred to herein as the fuel level or fill level of fuel tank 144) via a fuel level sensor (see FIG. 2). The level of fuel stored at fuel tank 144 (e.g., as identified by the fuel level sensor) may be communicated to vehicle operator 102, for example, via a fuel gauge or indication in a vehicle instrument panel 196. In additional or alternative examples, control system 190 may be coupled to external fuel pump 174 via wireless network 131 (e.g., in a "smart" fuel pump configuration). In such examples, control system 190 may receive (e.g., via wireless network 131) signals indicative of an amount of fuel dispensed, a rate of fueling (e.g., during the refueling event), a distance of the vehicle from external fuel pump 174, an amount of money or credit available to vehicle operator 102 with which to purchase fuel at external fuel pump 174, etc. Accordingly, an expected level of fuel (e.g., a level of fuel expected assuming undegraded fuel system components) may be determined by control system 190 based on the signal received from external fuel pump 174. As examples, the expected level of fuel may be determined by integrating under a curve plotting the amount of fuel dispensed over a fueling duration or, in the case of a rate of fueling being determined as a mathematical function of time, multiplying the rate of fueling by the fueling duration. In one example, one or more of the level of fuel stored at fuel tank 144, the amount of fuel dispensed, and the rate of fueling may constitute an input in a control routine stored in non-transitory memory of control system 190 for determining a degradation status of fuel system 140, such as the control routine described in detail below with reference to FIGS. 3-4B.

Vehicle propulsion system 101 may also include an ambient temperature/humidity sensor 198, and a roll stability control sensor, such as a lateral and/or longitudinal and/or yaw rate sensor(s) 199. As shown, sensors 198, 199 may be communicably coupled to control system 190, such that the control system may receive signals from the respective sensors. Vehicle instrument panel 196 may include indicator light(s) and/or a text-based display in which messages are displayed to vehicle operator 102 (e.g., such as an indication of a degradation status of a vehicle component generated by a diagnostic control routine). Vehicle instrument panel 196 may also include various input portions 197 for receiving an operator input, such as depressible buttons, touch screens, voice input/recognition, etc.

In some examples, vehicle propulsion system 101 may include one or more onboard cameras 135. Onboard camera(s) 135 may communicate photo and/or video imaging data to control system 190, for example. Onboard camera(s) 135 may in some examples be utilized to record images within a predetermined radius of the vehicle, for example. As such, control system 190 may employ signals (e.g., imaging data) received by onboard camera(s) 135 to detect and identify objects and locations external to the vehicle.

In additional or alternative examples, vehicle instrument panel 196 may communicate audio messages to vehicle operator 102 in combination with, or entirely without, visual display. Further, sensor(s) 199 may include a vertical accelerometer to indicate road roughness, the vertical accelerometer being communicably coupled to control system 190, for example. As such, control system 190 may adjust engine output and/or wheel brakes to increase vehicle stability in response to signals received from sensor(s) 199.

Control system 190 may be communicably coupled to other vehicles or infrastructures using appropriate communications technology. For example, control system 190 may be coupled to other vehicles or infrastructures via wireless network 131, which may comprise Wi-Fi, Bluetooth®, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicleto-infrastructure-to-vehicle (V2I2V), and/or vehicle-to-infrastructure (V2I or V2X) technology. The communication and the information exchanged between vehicles may either be direct between vehicles, or multi-hop. In some examples, longer range communications (e.g., WiMax) may be used in place of, or in conjunction with, V2V or V2I2V to extend coverage area on an order of a few miles. In still other examples, control system 190 may be communicably coupled to other vehicles or infrastructures via wireless network 131 and the Internet (e.g., cloud). In further examples, wireless network 131 may be a plurality of wireless networks 131 across which data may be communicated to vehicle propulsion system 101.

Vehicle propulsion system 101 may also include an onboard navigation system 132 (for example, a global positioning system, or GPS) with which vehicle operator 102 may interact. Onboard navigation system 132 may include one or more location sensors for assisting in estimating vehicle speed, vehicle altitude, vehicle position/location, etc. Such information may be used to infer engine operating parameters, such as local barometric pressure. As discussed above, control system 190 may be configured to receive information via the Internet or other communication networks. Accordingly, information received at control system 190 from onboard navigation system 132 may be cross-referenced to information available via the Internet to determine local weather conditions, local vehicle regulations, etc. In some examples, vehicle propulsion system 101 may include laser sensors (e.g., lidar sensors), radar sensors, sonar sensors, and/or acoustic sensors 133, which may enable vehicle location information, traffic information, etc., to be collected via the vehicle.

Referring now to FIG. 2, a schematic diagram 200 depicting a vehicle system 206 is shown. In some examples, vehicle system 206 may be an HEV system, such as a PHEV system. For example, vehicle system 206 may be the same as vehicle propulsion system 101 of FIG. 1. However, in other examples, vehicle system 206 may be implemented in a non-hybrid vehicle (e.g., a vehicle equipped with an engine and without a motor operable to at least partially propel the vehicle).

Vehicle system 206 may include an engine system 208 coupled to each of an evaporative emissions control system 251 and fuel system 140. Engine system 208 may include engine 110 having a plurality of cylinders 230. Engine 110 may include an engine air intake system 223 and an engine exhaust system 225. Engine air intake system 223 may include a throttle 262 in fluidic communication with an engine intake manifold 244 via an intake passage 242. Further, engine air intake system 223 may include an air box and filter (not shown) positioned upstream of throttle 262. Engine exhaust system 225 may include an exhaust manifold 248 leading to an exhaust passage 235 that routes exhaust gas to the atmosphere. Engine exhaust system 225 may include an emission control device 270, which in one example may be mounted in a close-coupled position in exhaust passage 235 (e.g., closer to engine 110 than an outlet of exhaust passage 235) and may include one or more exhaust catalysts. For instance, emission control device 270 may include one or more of a three-way catalyst, a lean nitrogen oxide ($NO_x$) trap, a diesel particulate filter, an oxidation catalyst, etc. In some examples, an electric heater 282 may be coupled to emission control device 270, and utilized to heat emission control device 270 to or beyond a predetermined temperature (e.g., a light-off temperature of emission control device 270).

It will be appreciated that other components may be included in engine system 208 such as a variety of valves and sensors. For example, a barometric pressure sensor 213 may be included in engine air intake system 223. In one example, barometric pressure sensor 213 may be a manifold air pressure (MAP) sensor and may be coupled to engine intake manifold 244 downstream of throttle 262. Barometric pressure sensor 213 may rely on part throttle or full or wide open throttle conditions, e.g., when an opening amount of throttle 262 is greater than a threshold, in order to accurately determine a barometric pressure.

Fuel system 140 may include fuel tank 144 coupled to a fuel pump system 221. Fuel pump system 221 may include one or more pumps for pressurizing fuel delivered to cylinders 230 via fuel injectors 266 during a single cycle of cylinders 230 (while only a single fuel injector 266 is shown at FIG. 2, additional fuel injectors may be provided for each cylinder 230). A distribution or relative amounts of fuel delivered, injection timing, etc. may vary with operating conditions such as engine load, engine knock, exhaust temperature, etc. responsive to different operating or degradation states of fuel system 140, engine 110, etc.

Fuel system 140 may be a return-less fuel system, a return fuel system, or any one of various other types of fuel system. Fuel tank 144 may hold a fuel 224 including a plurality of fuel blends, e.g., fuel with a range of alcohol concentrations, such as gasoline, various gasoline-ethanol blends (including E10, E85), etc. A fuel level sensor 234 disposed in fuel tank 144 may provide an indication of the fuel level ("Fuel Level Input") to a controller 212 included in control system 190. As depicted, fuel level sensor 234 may include a float coupled to a variable resistor. Alternatively, other types of fuel level sensors may be used.

Vapors generated in fuel system 140 may be routed to evaporative emissions control system 251 via vapor recovery line 231, before being purged to engine air intake system 223. Vapor recovery line 231 may be coupled to fuel tank 144 via one or more conduits. For example, vapor recovery line 231 may be coupled to fuel tank 144 via at least one conduit 271.

Evaporative emissions control system 251 may further include one or more fuel vapor containers or canisters 222 for capturing and storing fuel vapors. Fuel vapor canister 222 may be coupled to fuel tank 144 via at least one conduit 278 including at least one fuel tank isolation valve (FTIV) 252 for isolating the fuel tank during certain conditions. For example, FTIV 252 may normally be open. However, during a refueling event, FTIV 252 may close, causing pressure to build in vapor recovery line 231 as well as at a filler nozzle coupled to an external fuel pump. The increase in pressure at the filler nozzle may then trip the external fuel pump, stopping the refueling event automatically, and preventing overfilling.

Accordingly, in some examples, vapor recovery line 231 may be coupled to a fuel tank refilling or refueling system 219. In some examples, refueling system 219 may include a fuel cap 205 for sealing off the refueling system from the atmosphere. Refueling system 219 may be coupled to fuel tank 144 via a fuel filler pipe or neck 211. In some examples, fuel filler pipe 211 may include a flow meter sensor 220 operable to monitor a flow of fuel being supplied to fuel tank 144 via the fuel filler pipe (e.g., during refueling).

During refueling, fuel cap 205 may be manually opened or may be automatically opened responsive to a refueling request received at controller 212. A fuel dispensing device (e.g., 170) may be received by, and thereafter fluidically coupled to, refueling system 219, whereby fuel may be supplied to fuel tank 144 via fuel filler pipe 211. Refueling may continue until the fuel dispensing device is manually shut off or until fuel tank 144 is filled to a threshold fuel level (e.g., until feedback from fuel level sensor 234 indicates the threshold fuel level has been reached), at which point a mechanical or otherwise automated stop of the fuel dispensing device may be triggered.

Evaporative emissions control system 251 may include one or more emissions control devices, such as fuel vapor canister 222 filled with an appropriate adsorbent, the fuel vapor canister being configured to temporarily trap fuel vapors (including vaporized hydrocarbons) during refueling operations. In one example, the adsorbent used may be activated charcoal. Evaporative emissions control system 251 may further include a canister ventilation path or vent line 227 which may route gases out of fuel vapor canister 222 to the atmosphere when storing, or trapping, fuel vapors from fuel system 140.

Fuel vapor canister 222 may include a buffer 222a (or buffer region), each of the fuel vapor canister and the buffer including the adsorbent. As shown, a volume of buffer 222a may be smaller than (e.g., a fraction of) a volume of fuel vapor canister 222. The adsorbent in buffer 222a may be the same as, or different from, the adsorbent in fuel vapor canister 222 (e.g., both may include charcoal). Buffer 222a may be positioned within fuel vapor canister 222 such that, during canister loading, fuel tank vapors may first be adsorbed within the buffer, and then when the buffer is saturated, further fuel tank vapors may be adsorbed in a remaining volume of the fuel vapor canister. In comparison, during purging of fuel vapor canister 222, fuel vapors may first be desorbed from the fuel vapor canister (e.g., to a threshold amount) before being desorbed from buffer 222a. In other words, loading and unloading of buffer 222a may not be linear with loading and unloading of fuel vapor canister 222. As such, one effect of buffer 222a is to dampen any fuel vapor spikes flowing from fuel tank 144 to fuel vapor canister 222, thereby reducing a possibility of any fuel vapor spikes going to engine 110.

In some examples, one or more temperature sensors 232 may be coupled to and/or within fuel vapor canister 222. As fuel vapor is adsorbed by the adsorbent in fuel vapor canister 222, heat may be generated (heat of adsorption) Likewise, as fuel vapor is desorbed by the adsorbent in fuel vapor canister 222, heat may be consumed. In this way, the adsorption and desorption of fuel vapor by fuel vapor canister 222 may be monitored and estimated based on temperature changes within the fuel vapor canister.

Vent line 227 may also allow fresh air to be drawn into fuel vapor canister 222 when purging stored fuel vapors from fuel system 140 to engine air intake system 223 via purge line 228 and purge valve 261. For example, purge valve 261 may normally be closed but may be opened during certain conditions so that vacuum from engine intake manifold 244 may be provided to fuel vapor canister 222 for purging. In some examples, vent line 227 may further include an air filter 259 disposed therein downstream of fuel vapor canister 222.

Flow of air and vapors between fuel vapor canister 222 and the atmosphere may be regulated by a canister vent valve 229. Canister vent valve 229 may be a normally open valve, so that FTIV 252 may control venting of fuel tank 144 with the atmosphere. As described above, FTIV 252 may be positioned between fuel tank 144 and fuel vapor canister 222 within conduit 278. FTIV 252 may be a normally closed valve, that when opened, allows for venting of fuel vapors from fuel tank 144 to fuel vapor canister 222. Fuel vapors may then be vented to atmosphere via canister vent valve 229, or purged to engine air intake system 223 via canister purge valve 261.

Fuel system 140 may be a non-integrated refueling canister-only system (NIRCOS), in that fuel tank 144 may be substantially isolatable from fuel vapor canister 222 such that fuel vapors in fuel tank 144 and fuel vapor canister 222 may be independently controlled as desired (e.g., during refueling). During periods in which fuel tank 144 is fluidically decoupled from fuel vapor canister 222, a fuel vapor pressure may develop within the fuel tank. Accordingly, venting and depressurization control routines are often implemented for NIRCOS fuel tanks, along with structural reinforcement thereof. For example, a given NIRCOS may include numerous valves and venting lines coupled to fuel tank(s) included therein to ensure that any excess fuel vapor pressure is properly evacuated or redistributed. Further, NIRCOS fuel tanks may be constructed of high tensile-strength material, such as heavy steel, and configured with a plurality of standoffs therein, the plurality of standoffs extending between opposing walls of a given NIRCOS fuel tank, such that greater fuel vapor pressures may be withstood without fuel tank degradation.

As an alternative, fuel system 140 may include a bellows 291 to maintain a fuel vapor pressure of fuel tank 144 at, or near, atmospheric pressure. As such, complex structural configurations for managing excess fuel vapor pressure may be obviated. Specifically, bellows 291 may be disposed within and affixed to an upper surface 145 of fuel tank 144 and coupled to a surrounding environment (e.g., the atmosphere) via a port 293.

As shown in FIG. 2, the fuel level of fuel 224 in fuel tank 144 may be entirely below bellows 291, such that the (liquid) fuel may not be physically contacting the bellows and the bellows may be in a maximally expanded configuration. As described in detail below with reference to FIG. 5, when bellows 291 is contacted by rising fuel 224 during refueling, the bellows may compress along an axis 292 proportionally with an increase in the fuel level in fuel tank 144 (up until the bellows reaches a maximally compressed configuration). During compression, air within bellows 291 may be evacuated via port 293 directly to the surrounding environment. After refueling and during engine operation, fuel 224 may be provided to engine 110 via actuation of fuel pump system 221, such that the fuel level in fuel tank 144 may fall and bellows 291 may expand proportionally along axis 292 (up until the bellows again attains the maximally expanded configuration). During expansion, a pressure differential may be generated between bellows 291 and the surrounding environment such that air may be induced into the bellows via port 293.

In this way, a variable volume configuration may be provided to fuel tank 144 via expansion and contraction of bellows 291, such that a fuel vapor pressure of the fuel tank may be maintained within a threshold range of a predetermined pressure (e.g., an ambient pressure of the surrounding environment). In some examples, the fuel vapor pressure of fuel tank 144 may be maintained within the threshold range even across widely varying ambient temperatures, such as between 40 and 95° F. As such, fuel tank 144 may be formed from materials having relatively weaker strength and including fewer or no standoffs therein. Further, a more simplified configuration of valves and lines may be included in fuel system 140 relative to other NIRCOSs, as complex depressurization/venting routines may be obviated by the presence of bellows 291.

Fuel system 140 may be operated by controller 212 in a plurality of modes by selective adjustment of the various valves (e.g., responsive to the various sensors). For example, fuel system 140 may be operated in a refueling mode (e.g., when refueling is requested by a vehicle operator), wherein controller 212 may close FTIV 252, allowing bellows 291 to maintain the fuel vapor pressure of fuel tank 144 within the threshold range of the predetermined pressure. However, if bellows 291 is compressed to the maximally compressed configuration, and the fuel vapor pressure begins increasing beyond that manageable by fuel tank 144 (e.g., when the fuel tank becomes undesirably overfilled), fuel system 140 may be operated in a venting mode. In the venting mode, controller 212 may open FTIV 252 and canister vent valve 229, while maintaining canister purge valve 261 closed, to direct refueling vapors into fuel vapor canister 222 while preventing fuel vapors from being directed into engine intake manifold 244 (and thus provide a venting path for fuel vapors). As such, opening FTIV 252 may allow refueling vapors to be stored in fuel vapor canister 222. After refueling is completed, at least FTIV 252 may be closed once again.

As another example, the fuel system may be operated in a canister purging mode (e.g., after a given emission control device light-off temperature has been attained and with engine 110 running), wherein controller 212 may open canister purge valve 261 and canister vent valve 229 while closing FTIV 252. Herein, the vacuum generated by engine intake manifold 244 of (operating) engine 110 may be used to draw fresh air through vent line 227 and through fuel vapor canister 222 to purge stored fuel vapors into engine intake manifold 244. As such, in the canister purging mode, the purged fuel vapors from fuel vapor canister 222 may be combusted in engine 110. The canister purging mode may be continued until an amount or level of stored fuel vapors in fuel vapor canister 222 are below a threshold amount or level.

Control system 190, including controller 212, is shown receiving information from a plurality of sensors 216 (various examples of which are described herein) and sending control signals to a plurality of actuators 281 (various examples of which are described herein). As one example, sensors 216 may include one or more of exhaust gas sensor 237 located upstream of emission control device 270 in exhaust passage 235, temperature sensor 233 located downstream of emission control device 270 in exhaust passage 235, flow meter sensor 220 located in fuel filler pipe 211, fuel level sensor 234 located in fuel tank 144, and temperature sensor 232 located in fuel vapor canister 222. Other sensors such as pressure, temperature, air/fuel ratio, and composition sensors may be coupled to various locations in vehicle system 206 (for example, a fuel tank pressure sensor may further be included in fuel tank 144). As an additional or alternative example, actuators 281 may include fuel injector 266, throttle 262, FTIV 252, canister purge valve 261, and canister vent valve 229. Controller 212 may receive input data from sensors 216, process the input data, and trigger actuators 281 in response to the processed input data based on instructions or code programmed in non-transitory memory therein, the instructions or code corresponding to one or more control routines.

For example, during and immediately following a refueling event, control system 190 may be configured to monitor a fuel level of fuel tank 144 and the amount or rate of fuel supplied to the fuel tank. Actual and expected fueling curves may then be determined based on the fuel level and the amount/rate of fuel supplied, and the fueling curves may subsequently be compared to one another for deviations of an actual fuel level from an expected fuel level over a duration of the monitoring. An actual fuel economy of vehicle system 206 following the refueling event may further be determined, which may similarly be compared to an expected fuel economy.

The comparisons may be leveraged to infer a degradation status of fuel system 140 via diagnosis of one or more components included therein. For example, a size of a leak in fuel system 140 may be determined based on nuances of deviations of actual fueling trends collected during the refueling event from expected fueling trends. Further based on the deviations, the leak may be localized to a given component of fuel system 140 (e.g., bellows 291, fuel tank 144, etc.) and even, in some examples, a specific region of the given component (e.g., a side or a base of the bellows). Following the diagnosis, the vehicle operator may be notified with specific maintenance instructions and/or one or more engine operating parameters may be altered to mitigate degradation to vehicle performance and component reliability.

Figure 3:
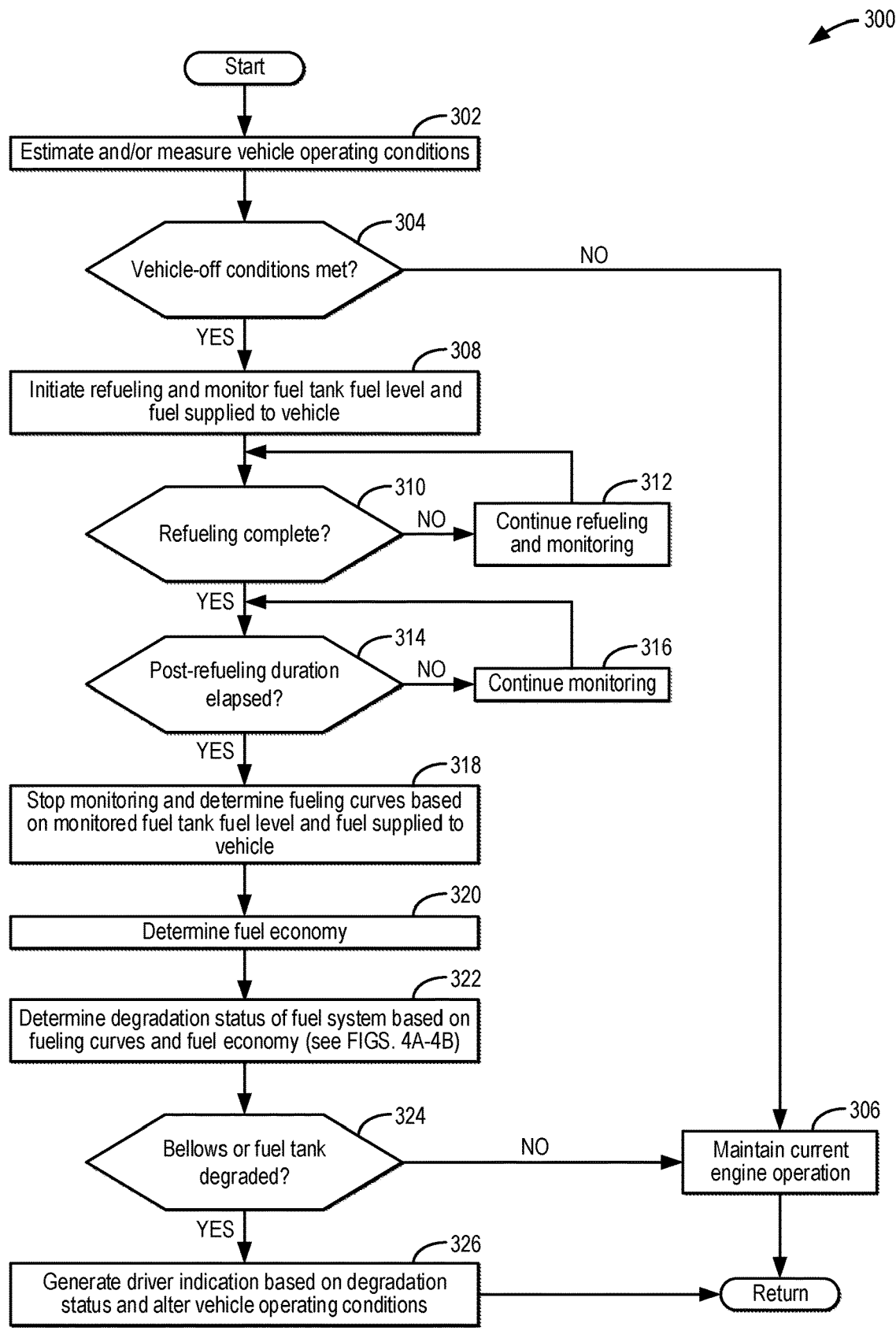
FIG. 3 shows a flow chart of a method for diagnosing a fuel tank, or a bellows included in the fuel tank, of a fuel system, such as the fuel system of FIG. 2.

One such control routine for diagnosing degradation to a fuel system is described in detail below with reference to FIGS. 3-4B. Referring now to FIG. 3, a flow chart of an example routine 300 for diagnosing a leak in a fuel tank or a bellows coupled to the fuel tank is shown. In some examples, the fuel tank and the bellows may be included in a fuel system designed for controlling fuel vapor pressures developed therein, such as fuel system 140 described above with reference to FIGS. 1 and 2. As such, the fuel system may be coupled to an engine controller operable to execute routine 300, such as controller 212. For example, the engine controller (e.g., controller 212) may be operable to receive one or more current vehicle operating conditions to determine whether a vehicle including the fuel system (e.g., 140) is in a vehicle-off condition and thereby ready for refueling. Thereafter, during and following the refueling (e.g., via refueling system 219), various fueling parameters may be monitored (e.g., based on feedback from sensors 216) for deviations from expected values indicative of a leak in the fuel tank (e.g., 144) or the bellows (e.g., 291). Responsive to a positive determination of the leak, a vehicle operator (e.g., 102) may be notified and one or more engine operating parameters may be altered or adjusted (e.g., via actuation of actuators 281). In this way, the fuel system may be passively monitored and subsequently diagnosed, such that vehicle performance may be maintained or improved (e.g., by expedient notification and mitigation of fuel system degradation), vehicle operator experience may be enhanced (e.g., bellows-based fuel vapor pressure control may be implemented to reduce fuel tank depressurization inconveniences without sacrificing system reliability), and overall manufacturing costs may be reduced (e.g., additional or specialized components may be minimized and complex depressurization/venting fuel system configurations may be simplified).

Instructions for carrying out routine 300 may be executed by the engine controller (e.g., controller 212) based on instructions stored on a non-transitory memory of the engine controller and in conjunction with signals received from various sensors (e.g., 216), other components of the fuel system (e.g., 140), other components of the vehicle coupled to the fuel system, and systems external to the vehicle and coupled thereto via a wireless network (e.g., 131). Further, the engine controller may employ various engine actuators (e.g., 281) to adjust engine operation, e.g., responsive to a determination of fuel system degradation, according to routine 300 as described below. As such, routine 300 may enable passive monitoring of fueling parameters during and following a refueling event, such that the fuel system (e.g., 140) may be accurately and efficiently diagnosed.

At 302, routine 300 may include estimating and/or measuring one or more vehicle operating conditions. In some examples, the one or more vehicle operating conditions may include one or more engine operating parameters, such as an engine speed, an engine load, an engine temperature, an engine coolant temperature, an engine oil temperature, a fuel temperature, a current operator torque demand, a manifold pressure, a manifold air flow, an exhaust gas air-fuel ratio, etc. In additional or alternative examples, the one or more vehicle operating conditions may include one or more ambient air conditions (e.g., of a surrounding environment), such as an ambient air pressure, an ambient air humidity, an ambient air temperature, etc. In some examples, the one or more vehicle operating conditions may be measured by one or more sensors communicatively coupled to the engine controller (e.g., the engine coolant temperature may be measured directly via a coolant temperature sensor) or may be inferred based on available data (e.g., the engine temperature may be estimated from the engine coolant temperature measured via the coolant temperature sensor).

Routine 300 may use the one or more vehicle operating conditions to infer a current state of vehicle operation, and determine whether to diagnose the fuel system (e.g., 140) based at least on one or more of the engine speed, the engine load, and the current operator torque demand. For example, at 304, routine 300 may include determining whether one or more vehicle-off conditions are met. In some examples, the one or more vehicle-off conditions may include one or more vehicle operating conditions immediately following receipt of a key-off request. For instance, the one or more vehicle-off conditions may include the engine speed being less than a threshold engine speed, the engine load being less than a threshold engine load, and/or current operator torque demand being less than a threshold operator torque demand. If the one or more vehicle-off conditions are not met (e.g., if the key-off request is not received or the engine speed, the engine load, or the current operator torque demand is greater than or equal to the respective threshold), routine 300 may proceed to 306, where routine 300 may include maintaining current engine operation. Specifically, combustion of fuel in cylinders (e.g., 230) of the engine (e.g., 110) may commence/continue and the vehicle may operate without interruption. Further, diagnosis of the fuel system (e.g., 140) may not be attempted again at least until a next refueling event is successfully initiated.

If the one or more vehicle-off conditions are met (e.g., if the key-off request is received and the engine speed, the engine load, or the current operator torque demand is less than the respective threshold), routine 300 may proceed to 308, where routine 300 may include initiating each of the refueling event and monitoring the fuel level of the fuel tank (e.g., 144) and an amount or a rate of fuel supplied/dispensed to the vehicle by a fuel dispensing device (e.g., 170) at the nearest refueling station. In fuel systems not including a bellows, a fuel tank may be expected to fill at a constant filling rate proportional to the rate of fuel supplied (assuming no leaks in the fuel tank). When the bellows (e.g., 291) is included in the fuel system (e.g., 140), for example, within, and affixed to an upper surface of, the fuel tank, a similar filling trend may be observed until the bellows is maximally compressed, after which the filling rate may be expected to increase stepwise to account for a reduced volume available to the filling fuel (e.g., as at least a portion of a remaining volume of the fuel tank may be occupied by the maximally compressed bellows). Deviations from such expected trends (e.g., the monitored fuel level being less than an expected fuel level for at least a portion of the refueling event or for a duration following the refueling event) may indicate that a leak is present in either the fuel tank or the bellows. Characterizations of specific deviations are discussed in detail below with reference to FIGS. 4A, 4B, and 6-8.

At 310, routine 300 may include determining whether the refueling event has completed. In some examples, the refueling event may be determined completed when the fuel level of the fuel tank (e.g., 144) has not increased for a threshold duration. In other examples, the refueling event may be determined completed responsive to a signal received from an external fuel pump via the wireless network (e.g., 131) indicating that the external fuel pump has ceased dispensing fuel to the vehicle. In other examples, the refueling event may be determined completed responsive to the fuel dispensing device (e.g., 170) no longer being fluidically coupled to a refueling system (e.g., 219). If the refueling event is determined to not be completed (e.g., if the fuel level has increased within the threshold duration), routine 300 may proceed to 312, where routine 300 may include continuing the refueling event and the monitoring of the fuel level and the amount/rate of fuel supplied. Routine 300 may then return to 310.

If the refueling event is determined to be completed (e.g., if the fuel level has not increased for the threshold duration), routine 300 may proceed to 314, where routine 300 may include determining whether a post-refueling duration has elapsed. Specifically, because certain deviations of an actual fuel level from an expected fuel level ascribable to fuel system degradation may occur following the refueling event, monitoring of the fuel level may continue beyond completion of the refueling event (e.g., at least until the post-refueling duration has elapsed). Accordingly, if the post-refueling duration has not elapsed, routine 300 may proceed to 316, where routine 300 may include continuing the monitoring of the fuel level. Routine 300 may then return to 314.

If the post-refueling duration has elapsed, routine 300 may proceed to 318, where routine 300 may include stopping the monitoring and determining actual and expected fueling curves based on the monitored fuel level and the monitored amount/rate of fuel supplied. In some examples, the actual fueling curve may be determined by plotting the monitored fuel level against time, and the expected fueling curve may be determined based on the rate of fuel supplied. Specifically, the expected fueling curve may be linear with a first slope after the refueling event begins and until the bellows (e.g., 291) is maximally compressed. After the bellows is maximally compressed (and thereby occupying a portion of a remaining volume available to be filled in the fuel tank, e.g., 144) and until the fuel level of the fuel tank is expected to reach 100%, the expected fueling curve may be linear with a second slope, the second slope being greater than the first slope. The first and second slopes may be functions of the rate of fuel supplied; accordingly, the engine controller (e.g., controller 212) may input the rate of fuel supplied into one or more look-up tables, functions, or maps stored in a memory thereof, which may output the corresponding first and second slopes. Prior to and following the refueling event, the expected fuel level may be assumed constant assuming the one or more vehicle-off conditions are met. However, if the vehicle is turned on and the engine (e.g., 110) resumes operation and consumption of fuel, the expected fuel level may decrease as a known function of one or more engine operating parameters (e.g., the engine load, the engine speed, the current operator torque demand, etc.). Accordingly, once the first and second slopes have been determined, the expected fueling curve may be plotted.

In other examples, the actual fueling curve may be determined by plotting the monitored fuel level against the amount of fuel supplied during the refueling event. However, it will be appreciated that, for a constant rate of fuel supplied to the fuel tank (e.g., 144), the plot of the monitored fuel level against the amount of fuel supplied will be practically equivalent to the plot of the monitored fuel level against time for a duration of the refueling event. Accordingly, the expected fueling curve may correspond to an expected fueling curve for which each of the first slope (e.g., after initiation of the refueling event and until the bellows, e.g., 291, is maximally compressed) and the second slope (e.g., after the bellows is maximally compressed and until the fuel level of the fuel tank is expected to reach 100%) may be the same for any given refueling event for a given vehicle. The first and second slopes may be obtained by the engine controller (e.g., controller 212) from a memory thereof.

At 320, routine 300 may include determining the fuel economy of the vehicle. Specifically, the fuel economy may be determined after or upon completion of the refueling event. In some examples, the fuel economy may be determined after the engine (e.g., 110) has operated for a predetermined duration, the predetermined duration terminating before or upon initiation of a subsequent refueling event (e.g., the next refueling event). In additional or alternative examples, the fuel economy may be determined upon receiving a request for the subsequent refueling event (e.g., the next refueling event).

In certain examples, determining the fuel economy upon initiation of the next refueling event (e.g., upon receiving the request for the next fueling event) may provide a more accurate diagnosis of a leak in the fuel system (e.g., 140). For instance, when a leak is identified and the fuel economy is lower than expected, the leak may be ascribed to the fuel tank (e.g., 144) rather than the bellows (e.g., 291) (as a degraded bellows may release fuel vapors and not leak fuel to a surrounding environment, but a degraded fuel tank may leak fuel which is then not consumed by the engine, e.g., 110). However, in the specific case where a large leak is present in a side of the bellows, fuel may become transiently trapped in the bellows without leaking out of the fuel system. Accordingly, the fuel economy may initially be less than expected following the refueling event. Upon the next refueling event, after pumping fuel for a sufficient duration, the fuel trapped in the bellows may have evacuated, thereby restoring the fuel economy to an expected level. As such, by determining the fuel economy upon the next refueling event, a "false positive" identification of the leak being in the fuel tank may be averted.

At 322, routine 300 may include determining a degradation status of the fuel system (e.g., 140) based on the actual and expected fueling curves and the fuel economy. Specifically, and as described below with reference to FIGS. 4A and 4B, the degradation status may include an indication that no components within the fuel system (e.g., 140) are degraded or an indication that at least one component (e.g., the fuel tank 144, the bellows 291) is degraded. A given component being degraded may include, for example, a leak being present in the given component. Accordingly, in some examples, the degradation status may further indicate a size and/or a relative location of the leak on the given component.

At 324, routine 300 may include determining whether the degradation status indicates that at least one of the fuel tank (e.g., 144) and the bellows (e.g., 291) is degraded. If no degradation to both the fuel tank and the bellows is indicated, routine 300 may proceed to 306, where routine 300 may include maintaining current engine operation. Specifically, combustion of fuel in cylinders (e.g., 230) of the engine (e.g., 110) may commence/continue and the vehicle may operate without interruption. Further, diagnosis of the fuel system (e.g., 140) may not be attempted again at least until the next refueling event is successfully initiated.

If degradation of the fuel tank (e.g., 144) or the bellows (e.g., 291) is indicated, routine 300 may proceed to 326, where routine 300 may include generating a driver indication based on the degradation status, storing a diagnostic code, and/or altering or adjusting the one or more of the vehicle operating conditions so as to maintain the fuel vapor pressure of the fuel tank within a predetermined range. In some examples, the generated driver indication may be displayed to the vehicle operator (e.g., 102) at a vehicle instrument panel (e.g., 196) or other display visible to the vehicle operator. In such examples, the driver indication may indicate a presence of the leak in the fuel tank or the bellows in addition to instructions for repairing the leak or recommendations as to maintenance of the degraded component. In one example, the driver indication may further indicate the size and/or the relative location of the leak (e.g., when the size and/or the relative location is determined). Additionally or alternatively, the driver indication may include lighting a malfunction indicator lamp (MIL) and the diagnostic code may be set and stored in the memory of the engine controller. In one example, lighting the MIL may indicate a request that the vehicle be taken to a service technician, and the diagnostic code that is set may indicate to the service technician that the fuel tank or the bellows is degraded. The light and the code may reset after the vehicle has been serviced and the degraded fuel tank or bellows has been replaced or repaired.

The bellows (e.g., 291) may be provided within the fuel tank (e.g., 144) to maintain the fuel vapor pressure of the fuel tank within the predetermined range. The bellows, being coupled to the surrounding environment via a port (e.g., 293), may thus maintain the fuel vapor pressure of the fuel tank substantially in equilibrium with the surrounding environment. As such, the predetermined range may be a relatively narrow range including an ambient pressure of the surrounding environment (for example, the surrounding environment may be the atmosphere such that the ambient pressure may be a local atmospheric pressure).

When the bellows (e.g., 291) leaks, however, at least a portion of the fuel vapor in the fuel tank (e.g., 144) may pass through the bellows and escape through the port (e.g., 293) coupled to the bellows. Similarly, when the fuel tank leaks, at least a portion of the fuel vapor (or the liquid fuel itself) may escape from the fuel tank via the leak. Accordingly, to mitigate an amount of untreated fuel vapors escaping from the fuel tank, one or more of the vehicle operating conditions that generate excess fuel vapors may be altered or adjusted. For instance, one or more of the engine operating parameters may be altered or adjusted (e.g., minimized, maintained below respective thresholds, lowered to near or at zero, etc.), including, for example, one or more of the engine speed and the engine load. Additionally or alternatively, the engine controller (e.g., controller 212) may command the vehicle enter an electric drive mode, where only a motor (e.g., 120) may propel drive wheels (e.g., 130) of the vehicle so that the fueling system (e.g., 140) is not relied upon to power the engine (e.g., 110). Additionally or alternatively, an FTIV (e.g., 252) coupling the fuel tank (e.g., 144) to a fuel vapor canister (e.g., 222) may be adjusted to a fully open position to vent at least some of the fuel vapor in the fuel tank. Additionally or alternatively, the engine controller may introduce a fuel level threshold above which the fuel tank may not be filled. Additionally or alternatively, the driver indication may include an advisory against parking the vehicle on an inclined slope greater than a threshold incline, such as 6%. The one or more vehicle operating conditions may remain altered or adjusted until servicing of the fuel system may be performed and the bellows or the fuel tank is repaired.

Figure 4A:
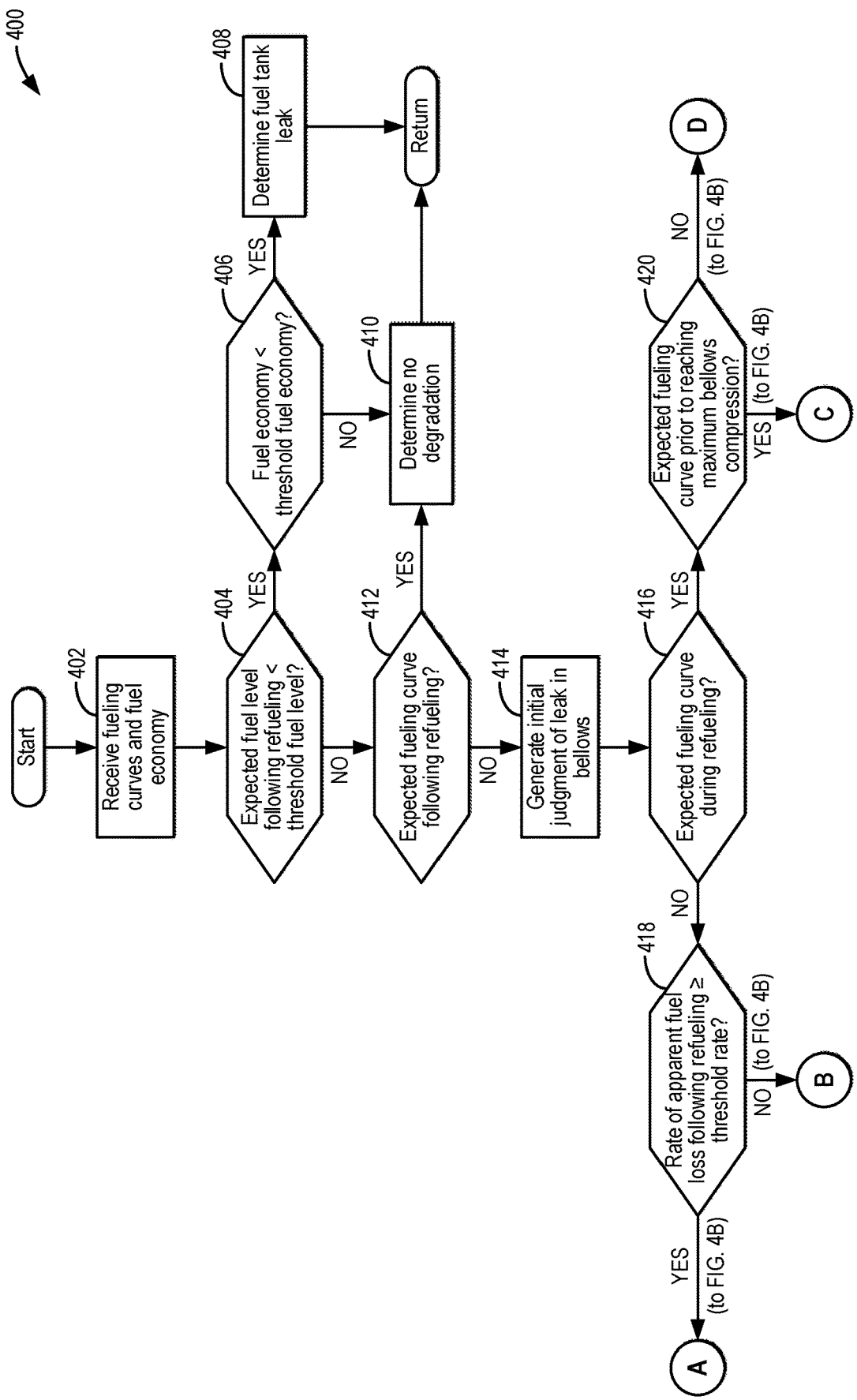
FIGS. 4A and 4B show a flow chart of a method for determining a degradation state of the fuel system.
Figure 4B:
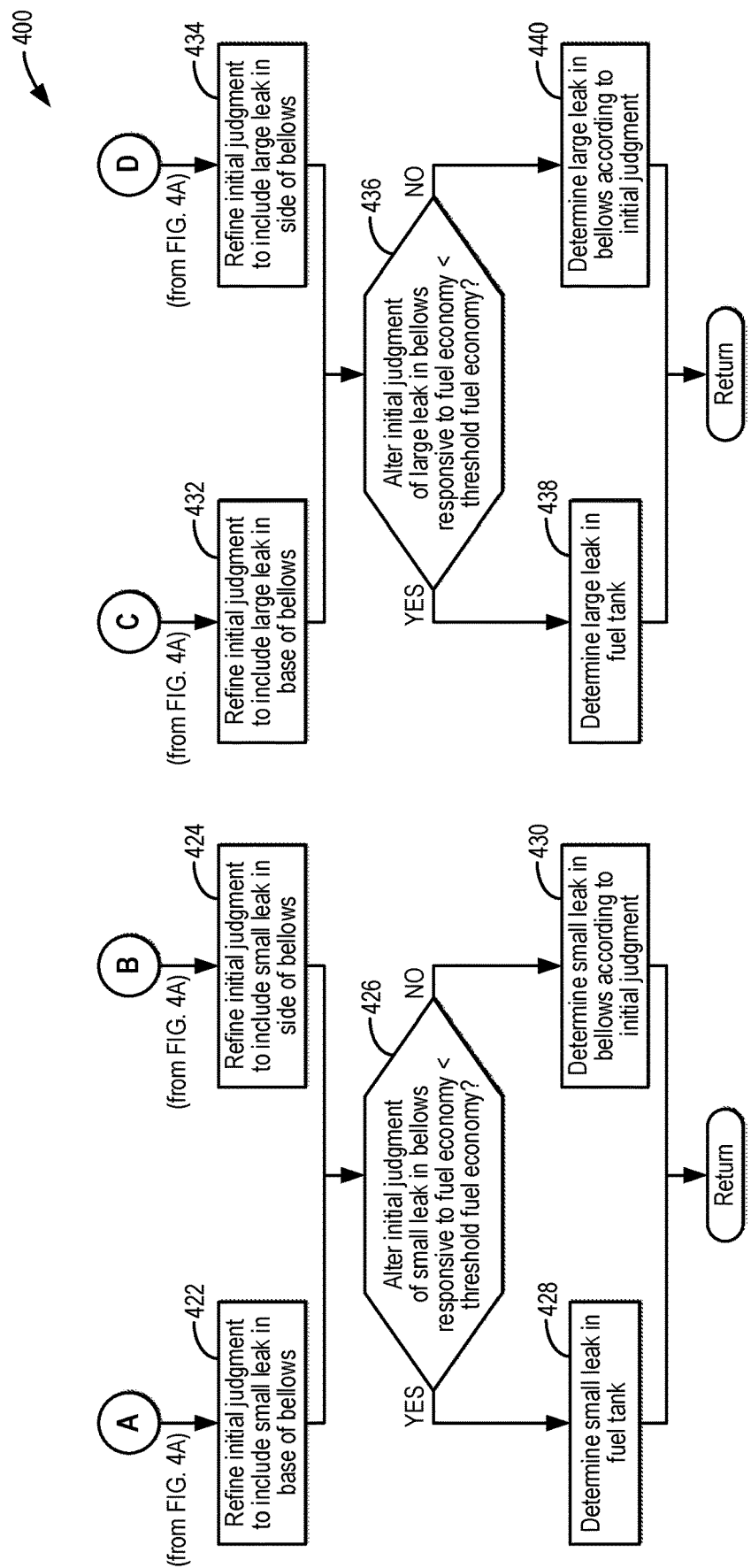

Referring now to FIGS. 4A and 4B, a flow chart of an example routine 400 for determining a degradation status of a fuel system of a vehicle is shown. In some examples, the degradation status of the fuel system may indicate degradation to a particular fuel system component, such as a fuel tank or bellows coupled to the fuel tank. As such, the fuel system may be fuel system 140 including fuel tank 144 and bellows 291, as described above with reference to FIGS. 1 and 2. Further, the fuel system may be coupled to an engine controller operable to execute routine 400, such as controller 212. Accordingly, in some examples, routine 400 may be performed as part of routine 300 (such as at 322), which may similarly be executable on the engine controller. In such examples, routine 300 may rely upon the degradation status at 324 to determine whether at least one of the bellows and the fuel tank is degraded.

Instructions for carrying out routine 400 may be executed by the engine controller (e.g., controller 212) based on instructions stored on a non-transitory memory of the engine controller and in conjunction with signals received from various sensors (e.g., 216), other components of the fuel system (e.g., 140), other components of the vehicle coupled to the fuel system, and systems external to the vehicle and coupled thereto via a wireless network (e.g., 131). Further, the engine controller may employ various engine actuators (e.g., 281) to adjust engine operation, e.g., responsive to a determination of fuel system degradation, according to routine 300 of FIG. 3 as described above.

Beginning at FIG. 4A, at 402, routine 400 may include receiving a fuel economy of the vehicle and actual and expected fueling curves corresponding to a preceding refueling event. In some examples, the fuel economy may be determined at 320 of routine 300, and the actual and expected fueling curves may be determined at 318 of routine 300, as described in detail above with reference to FIG. 3. In one example, the actual fueling curve may be a plot of an actual fuel level of the fuel tank (e.g., 144) against time and the expected fueling curve may be a plot of an expected fuel level of the fuel tank against time, the expected fueling curve being determined based on a rate of fuel supplied to the fuel tank via a fuel dispensing device (e.g., 170). Each of the actual and expected fueling curves may be plotted at least from initiation of the refueling event through completion of each of the refueling event and a post-refueling duration following the refueling event. As discussed in greater detail above, deviations of the actual fuel level and the fuel economy from respective expected values may indicate the presence of a leak in a particular component of the fuel system (e.g., 140), including, in some examples, further information characterizing the leak, such as a size and/or a relative location of the leak. Accordingly, and as described herein, the degradation status of the fuel system may be determined by passively monitoring the (actual) fuel level of the fuel tank during and immediately following a refueling event, as well as passively calculating the fuel economy of the vehicle following the same refueling event.

At 404, routine 400 may include determining whether the expected fuel level following the refueling event is less than a threshold fuel level. Specifically, the threshold fuel level may correspond to a highest fuel level at which the bellows (e.g., 291) remains maximally expanded. If the expected fuel level following the refueling event is less than the threshold fuel level, determination of degradation of the bellows may not be accomplishable via routine 400 (as deviations to the actual fueling curve indicative of the bellows being degraded may originate from fuel leaking into the degraded bellows, which would be unlikely to occur if the liquid fuel is entirely below the bellows and therefore not interacting with or compressing the bellows).

Accordingly, if the expected fuel level following the refueling event is less than the threshold fuel level, routine 400 may proceed to 406, where routine 400 may include determining whether the fuel economy is less than a threshold fuel economy. In some examples, the threshold fuel economy may be at, or near, an expected fuel economy (e.g., the fuel economy of the vehicle assuming an undegraded fuel system). Specifically, when the fuel economy is lower than expected, regardless of deviations of the actual fueling curve from the expected fueling curve, routine 400 may infer that the fuel tank (e.g., 144) has a leak (rather than the bellows, e.g., 291).

Accordingly, if the fuel economy is less than the expected fuel economy, routine 400 may proceed to 408, where routine 400 may include determining a degradation status indicating that the fuel tank (e.g., 144) is leaking. If the fuel economy is greater than or equal to the expected fuel economy, routine 400 may proceed to 410, where routine 400 may include determining a degradation status indicating no degradation to either the fuel tank or the bellows (e.g., 291).

Returning to 404, if the expected fuel level following the refueling event is greater than or equal to the threshold fuel level, routine 400 may proceed to 412, where routine 400 may include determining whether the actual fueling curve following the refueling event matches the expected fueling curve following the refueling event (e.g., during the post-refueling duration). Specifically, though the expected fuel level following the refueling event may be high enough to interact with and thereby compress the bellows (e.g., 291), routine 400 may infer no degradation if both a constant fuel level is maintained following the refueling event and the constant fuel level is at the expected (constant) fuel level (which would be unlikely if the fuel tank, e.g., 144, included a leak through which fuel may escape or the bellows included a leak through which fuel may fill the bellows and thereby lower the monitored fuel level below the expected fuel level). Thus, when the actual fueling curve following the refueling event matches the expected fueling curve following the refueling event, no apparent fuel loss ascribable to fuel system leaks may be detected.

Accordingly, if the actual fueling curve following the refueling event matches the expected fueling curve following the refueling event, routine 400 may proceed to 410, where routine 400 may include determining a degradation status indicating no degradation to either the fuel tank or the bellows (e.g., 291). If the actual fueling curve following the refueling event deviates from the expected fueling curve following the refueling event (and the expected fuel level following the refueling event is greater than or equal to the threshold fuel level, as determined at 404), routine 400 may proceed to 414, where routine 400 may include generating an initial judgment of a leak in the bellows. Specifically, determining that the actual fueling curve following the refueling event deviates from the expected fueling curve following the refueling event may include detecting an apparent fuel loss following the refueling event (e.g., the actual fueling curve following the refueling event is below the expected fueling curve following the refueling event when plotted on the same axes).

The initial judgment may not be a final determination of the degradation status of the fuel system (e.g., 140), as additional factors may be considered which may result in the initial judgment being refined or altered. For example, the initial judgment may be refined to indicate further information concerning the leak, such as the size of the leak or the location of the leak on the bellows (e.g., on a side or a base thereof) or the initial judgment may be altered to indicate that the leak is actually in the fuel tank (e.g., 144).

To begin finalizing the initial judgment, routine 400 may proceed to 416, where routine 400 may include determining whether the actual fueling curve during the refueling event matches the expected fueling curve during the refueling event (e.g., whether an apparent fuel loss is detected during the refueling event). In some examples, the engine controller (e.g., controller 212) may determine whether the actual fueling curve during the refueling event matches the expected fueling curve during the refueling event by determining whether a duration of the refueling event lasted as long as expected (e.g., the refueling event may continue until a requested fuel level is reached).

Specifically, though a leak is assumed present in the fuel system (e.g., 140), the leak may be relatively small (e.g., below a threshold size or within a predefined small size range), such that deviations from expected fuel levels may be confined to the post-refueling duration (e.g., when pressures from a higher fuel level may force fuel through the relatively small leak). Accordingly, the actual fueling curve during the refueling event may be determined to match the expected fueling curve during the refueling event and/or the duration of the refueling event may be determined to have lasted as long as expected. In such cases, the actual fueling curve following the refueling event may not be constant as expected (while the fuel gradually escapes via the relatively small leak), and routine 400 may proceed to 418, where routine 400 may include determining whether a rate of the apparent fuel loss following the refueling event is greater than or equal to a threshold rate.

Continuing now to FIG. 4B, if the rate of the apparent fuel loss following the refueling event is determined to be greater than or equal to the threshold rate at 418 of FIG. 4A, routine 400 may proceed to 422, where routine 400 may include refining the initial judgment to include the leak being a small leak (e.g., the size of the leak being less than the threshold size or within the predefined small size range) in a base of the bellows (e.g., 291). Specifically, since a greater pressure may be experienced at the base of the bellows than at a side of the bellows, the rate of the apparent fuel loss may be greater (e.g., than the threshold rate) when fuel is leaking into the bellows via a leak in the base than when fuel is leaking into the bellows via a leak in the side. Accordingly, if the rate of the apparent fuel loss following the refueling event is determined to be less than the threshold rate at 418 of FIG. 4A, routine 400 may proceed to 424, where routine 400 may include refining the initial judgment to include the leak being a small leak (e.g., the size of the leak being less than the threshold size or within the predefined small size range) in the side of the bellows.

Regardless of whether the initial judgment is refined to indicate that the leak is in the base of the bellows (e.g., 291) at 422 or the side of the bellows at 424, routine 400 may proceed to 426, where routine 400 may include determining whether to alter the initial judgment of the small leak in the bellows responsive to the fuel economy being less than the threshold fuel economy. In some examples, the threshold fuel economy may be at, or near, an expected fuel economy (e.g., the fuel economy of the vehicle assuming an undegraded fuel system). Thus, in one example, the threshold fuel economy may be equivalent to the threshold fuel economy discussed above at 406 of FIG. 4A. Specifically, and as further discussed above at 406 of FIG. 4A, when the fuel economy is lower than expected, regardless of deviations of the actual fueling curve from the expected fueling curve, routine 400 may infer that the fuel tank (e.g., 144) has a leak (rather than the bellows).

Accordingly, if the fuel economy is less than the expected fuel economy, routine 400 may proceed to 428, where routine 400 may include altering the initial judgment and determining a degradation status indicating that the fuel tank (e.g., 144) has a small leak. If the fuel economy is greater than or equal to the threshold fuel economy, routine 400 may proceed to 430, where routine 400 may include not altering the initial judgment (e.g., generated at 414 of FIG. 4A and refined at 422 or 424) and determining a degradation status indicating that the bellows (e.g., 291) has a small leak. The degradation status determined at 430 may further indicate that the small leak is in the base of the bellows (if the rate of the apparent fuel loss following the refueling event was determined at 418 to be greater than or equal to the threshold rate) or the side of the bellows (if the rate of the apparent fuel loss following the refueling event was determined at 418 to be less than the threshold rate).

Alternatively, and returning now to FIG. 4A, the leak may be relatively large (e.g., greater than or equal to the threshold size or within a predefined large size range, where the predefined large size range may be larger than and non-overlapping with the predefined small size range), such that deviations from expected fuel levels may occur during the refueling event (e.g., fuel may pass through the relatively large leak as soon as the fuel level reaches the location of the leak). Accordingly, the actual fueling curve during the refueling event may be determined to deviate from the expected fueling curve during the refueling event and/or the duration of the refueling event may be determined to have lasted longer than expected. In such cases, the deviation may be characterized in one or more of two regimes: (i) prior to when the bellows (e.g., 291) is expected to reach maximal compression; and (ii) following when the bellows is expected to reach maximal compression and prior to when the fuel level is expected to reach 100%. Thus, routine 400 may proceed to 420, where routine 400 may include determining whether the actual fueling curve prior to when the bellows is expected to reach maximal compression (e.g., during regime (i)) matches the expected fueling curve prior to the bellows is expected to reach maximal compression (e.g., during regime (i)).

Continuing now to FIG. 4B, if the actual fueling curve prior to when the bellows (e.g., 291) is expected to reach maximal compression is determined to match the expected fueling curve prior to when the bellows is expected to reach maximal compression at 420 of FIG. 4A, routine 400 may proceed to 432, where routine 400 may include refining the initial judgment to include the leak being a large leak (e.g., the size of the leak being greater than or equal to the threshold size or within the predefined large size range) in the base of the bellows. Specifically, when the base of the bellows has a large leak, the fuel level may continue to rise substantially unabated. However, instead of the bellows compressing with the rising fuel level up until maximal compression is reached, at least some fuel may instead enter an interior volume of the bellows. As such, the actual fueling curve prior to when the bellows is expected to reach maximal compression may match the expected fueling curve prior to when the bellows is expected to reach maximal compression (e.g., during regime (i)). However, the actual fuel level following when the bellows is expected to reach maximal compression (e.g., during regime (ii)) may deviate from the expected fuel level following when the bellows is expected to reach maximal compression (e.g., during regime (ii)) when the base of the bellows has the large leak, as the actual fuel level may continue to rise at a same rate rather than at an (expected) increased rate due to the large leak in the base preventing the bellows from compressing and allowing fuel to continue entering the bellows.

If, instead, the actual fueling curve prior to when the bellows (e.g., 291) is expected to reach maximal compression deviates from the expected fueling curve prior to when the bellows is expected to reach maximal compression at 420 of FIG. 4A, routine 400 may proceed to 434, where routine 400 may include refining the initial judgment to include the leak being a large leak (e.g., the size of the leak being greater than or equal to the threshold size or within the predefined large size range) in the side of the bellows. Specifically, as a large leak may fluidically couple the fuel tank (e.g., 144) to the surrounding atmosphere via the interior volume of the bellows and the port (e.g., 293), the bellows may not compress as expected and a rate at which the fuel level rises within the fuel tank may correspondingly deviate from an expected value. If the large leak is in the side of the bellows, fuel may not enter the bellows until the fuel level rises high enough to enter the large leak. When the fuel level reaches the leak, fuel may enter the bellows and thereby slow the rate at which the fuel level rises within the fuel tank (e.g., 144) until a fuel level within the interior volume of the bellows matches the fuel level in the fuel tank (whereafter the actual fueling curve may match the expected fueling curve until the bellows is expected to reach maximal compression). As such, the actual fueling curve prior to when the bellows is expected to reach maximal compression may deviate from the expected fueling curve prior to when the bellows is expected to reach maximal compression (e.g., during at least a portion of regime (i)). Further, the actual fuel level following when the bellows is expected to reach maximal compression (e.g., during regime (ii)) may deviate from the expected fuel level following when the bellows is expected to reach maximal compression (e.g., during regime (ii)) when the side of the bellows has the large leak, as the actual fuel level may continue to rise at a same rate rather than at an (expected) increased rate due to the large leak in the side preventing the bellows from compressing and allowing fuel to continue entering the bellows.

Regardless of whether the initial judgment is refined to indicate that the leak is in the base of the bellows (e.g., 291) at 432 or the side of the bellows at 434, routine 400 may proceed to 436, where routine 400 may include determining whether to alter the initial judgment of the large leak in the bellows responsive to the fuel economy being less than the threshold fuel economy. In some examples, the threshold fuel economy may be at, or near, an expected fuel economy (e.g., the fuel economy of the vehicle assuming an undegraded fuel system). Thus, in one example, the threshold fuel economy may be equivalent to the threshold fuel economy discussed above at 406 of FIG. 4A. Specifically, and as further discussed above at 406 of FIG. 4A, when the fuel economy is lower than expected, regardless of deviations of the actual fueling curve from the expected fueling curve, routine 400 may infer that the fuel tank (e.g., 144) has a leak (rather than the bellows).

Accordingly, if the fuel economy is less than the expected fuel economy, routine 400 may proceed to 438, where routine 400 may include altering the initial judgment and determining a degradation status indicating that the fuel tank (e.g., 144) has a large leak. If the fuel economy is greater than or equal to the threshold fuel economy, routine 400 may proceed to 440, where routine 400 may include not altering the initial judgment (e.g., generated at 414 of FIG. 4A and refined at 432 or 434) and determining a degradation status indicating that the bellows (e.g., 291) has a large leak. The degradation status determined at 440 may further indicate that the large leak is in the base of the bellows (if the actual fueling curve prior to when the bellows was expected to reach maximal compression was determined at 420 to match the expected fueling curve prior when the bellows was expected to reach maximal compression) or the side of the bellows (if the actual fueling curve prior to when the bellows was expected to reach maximal compression was determined at 420 to deviate from the expected fueling curve prior when the bellows was expected to reach maximal compression).

Referring now to FIGS. 5-7, three exemplary degradation states of bellows 291 of the fuel system of FIGS. 1 and 2 (e.g., fuel system 140) are schematically depicted at least for ease of comparison. Differences in extents of bellows expansion and fuel levels during filling of fuel tank 144 may be determined by an engine controller (e.g., controller 212) coupled to the fuel system based on feedback received from a fuel level sensor (e.g., 234) in fuel tank 144 (not shown in FIGS. 5-7) and an external fuel pump (e.g., 174; not shown in FIGS. 5-7), such that a specific degradation state of bellows 291 may be inferred.

For example, and referring now to FIG. 5, schematic diagrams 500, 525, 550, and 575 depicting bellows 291 in a first exemplary degradation state are shown, where the first exemplary degradation state includes the bellows not being degraded. Specifically, schematic diagrams 500, 525, 550, and 575 depict sequential snapshots in time prior to, during, and following a refueling event.

Beginning at schematic diagram 500, fuel tank 144 is shown having fuel 224 filled up to a fuel level 502. Fuel tank 144 is further shown being coupled to fuel filler pipe 211, where the fuel filler pipe is operable to fill the fuel tank with additional fuel 224. Bellows 291 is shown positioned within, and affixed to an interior of, fuel tank 144, and in the maximally expanded configuration (e.g., the bellows is expanded at a maximal extent 501). Bellows 291 is further shown being coupled to a surrounding environment via port 293, such that a fuel vapor pressure in fuel tank 144 (e.g., above fuel 224) may be maintained at, or near, an ambient pressure of the surrounding environment.

At schematic diagram 525, fuel 224 is actively being supplied to fuel tank 144 via fuel filler pipe 211. Accordingly, fuel 224 may fill fuel tank 144 at least to a fuel level 527 higher than fuel level 502 and bellows 291 may compress 530 therewith until the maximally compressed configuration is reached (e.g., the bellows is expanded at a minimal extent 526 lower than maximal extent 501). As further shown, during compression 530 of bellows 291, air within the bellows may be evacuated therefrom via port 293.

At schematic diagram 550, fuel 224 is no longer being supplied to fuel tank 144 via fuel filler pipe 211 and a fuel level 552 is increased to higher than each of fuel levels 502 and 527 (e.g., at, or near, 100%). Specifically, though bellows 291 previously reached the maximally compressed configuration, filling of fuel 224 continued until fuel level 552 was reached and the bellows was partially submerged. Further, because bellows 291 has reached the maximally compressed configuration, no further air within the bellows may be evacuated therefrom via port 293.

At schematic diagram 575, fuel 224 is actively being pumped to the engine (e.g., 110; not shown at FIG. 5). Accordingly, fuel 224 still left in fuel tank 144 may drop from fuel level 552 to a fuel level 577 and bellows 291 may expand 580 therewith until the maximally expanded configuration is reached (e.g., the bellows is expanded at maximal extent 501). As further shown, during expansion 580 of bellows 291, air within the bellows may reenter an interior space thereof via port 293.

Referring now to FIG. 6, schematic diagrams 600, 625, 650, and 675 depicting bellows 291 in a second exemplary degradation state are shown, where the second exemplary degradation state includes a side 610 of the bellows having a rupture 603. Specifically, schematic diagrams 600, 625, 650, and 675 depict sequential snapshots in time prior to, during, and following a refueling event.

Beginning at schematic diagram 600, fuel tank 144 is shown having fuel 224 filled up to a fuel level 602. Fuel tank 144 is further shown being coupled to fuel filler pipe 211, where the fuel filler pipe is operable to fill the fuel tank with additional fuel 224. Bellows 291 is shown positioned within, and affixed to an interior of, fuel tank 144, and in the maximally expanded configuration (e.g., the bellows is expanded at maximal extent 501). Bellows 291 is further shown being coupled to a surrounding environment via port 293.

At schematic diagram 625, fuel 224 is actively being supplied to fuel tank 144 via fuel filler pipe 211. Accordingly, fuel 224 may fill fuel tank 144 at least to a fuel level 627 higher than fuel level 602. However, due to rupture 603, bellows 291 may not substantially compress as fuel 224 is supplied to fuel tank 144 such that the bellows may remain in the maximally expanded configuration is reached (e.g., the bellows remains expanded at, or near, maximal extent 501). As further shown, since fuel level 627 is inclusive of rupture 603, fuel 224 may enter the interior volume of bellows 291 via the rupture and displace air within the bellows (which may be evacuated therefrom via port 293).

At schematic diagram 650, fuel 224 is no longer being supplied to fuel tank 144 via fuel filler pipe 211 and a fuel level 652 is increased to higher than each of fuel levels 602 and 627 (e.g., at, or near, 100%). Further, while filling of fuel 224 continued until fuel level 652 was reached and partially submerged bellows 291, fuel also continued to spill into the interior volume of the bellows through rupture 603. Since fuel 224 is no longer being supplied to fuel tank 144 via fuel filler pipe 211, however, air within bellows 291 is no longer evacuating therefrom via port 293.

At schematic diagram 675, fuel 224 is actively being pumped to the engine (e.g., 110; not shown at FIG. 6). Accordingly, fuel 224 still left in fuel tank 144 may drop from fuel level 652 to a fuel level 677 below rupture 603. Because of rupture 603, bellows 291 may still be maintained at the maximally expanded configuration (e.g., the bellows may remain expanded at maximal extent 501). However, the interior space of bellows 291 may include at least a portion of fuel 224 which entered via rupture 603 and which may also empty into fuel tank 144 via the rupture once the fuel level drops therebelow (as shown). As further shown, while fuel 224 evacuates from bellows 291 via rupture 603, air within the bellows may reenter the interior space thereof via port 293.

Referring now to FIG. 7, schematic diagrams 700, 725, 750, and 775 depicting bellows 291 in a second exemplary degradation state are shown, where the second exemplary degradation state includes a side 710 of the bellows having a rupture 703. Specifically, schematic diagrams 700, 725, 750, and 775 depict sequential snapshots in time prior to, during, and following a refueling event.

Beginning at schematic diagram 700, fuel tank 144 is shown having fuel 224 filled up to a fuel level 702. Fuel tank 144 is further shown being coupled to fuel filler pipe 211, where the fuel filler pipe is operable to fill the fuel tank with additional fuel 224. Bellows 291 is shown positioned within, and affixed to an interior of, fuel tank 144, and in the maximally expanded configuration (e.g., bellows 291 is expanded at maximal extent 501). Bellows 291 is further shown being coupled to a surrounding environment via port 293.

At schematic diagram 725, fuel 224 is actively being supplied to fuel tank 144 via fuel filler pipe 211. Accordingly, fuel 224 may fill fuel tank 144 at least to a fuel level 727 higher than fuel level 702. However, due to rupture 703, bellows 291 may not substantially compress as fuel 224 is supplied to fuel tank 144 such that the bellows may remain in the maximally expanded configuration is reached (e.g., the bellows remains expanded at, or near, maximal extent 501). As further shown, since fuel level 727 is inclusive of rupture 703, fuel 224 may enter the interior volume of bellows 291 via the rupture and displace air within the bellows (which may be evacuated therefrom via port 293).

At schematic diagram 750, fuel 224 is no longer being supplied to fuel tank 144 via fuel filler pipe 211 and a fuel level 752 is increased to higher than each of fuel levels 702 and 727 (e.g., at, or near, 100%). Further, while filling of fuel 224 continued until fuel level 752 was reached and partially submerged bellows 291, fuel also continued to spill into the interior volume of the bellows through rupture 703. Since fuel 224 is no longer being supplied to fuel tank 144 via fuel filler pipe 211, however, air within bellows 291 is no longer evacuating therefrom via port 293.

At schematic diagram 775, fuel 224 is actively being pumped to the engine (e.g., 110; not shown at FIG. 7). Accordingly, fuel 224 still left in fuel tank 144 may drop from fuel level 752 to a fuel level 777 below rupture 703. Because of rupture 703, bellows 291 may still be maintained at the maximally expanded configuration (e.g., the bellows may remain expanded at maximal extent 501). However, the interior space of bellows 291 may include at least a portion of fuel 224 which entered via rupture 703 and which may also empty into fuel tank 144 via the rupture once the fuel level drops therebelow (as shown). As further shown, while fuel 224 evacuates from bellows 291 via rupture 703, air within the bellows may reenter the interior space thereof via port 293.

Figure 8:
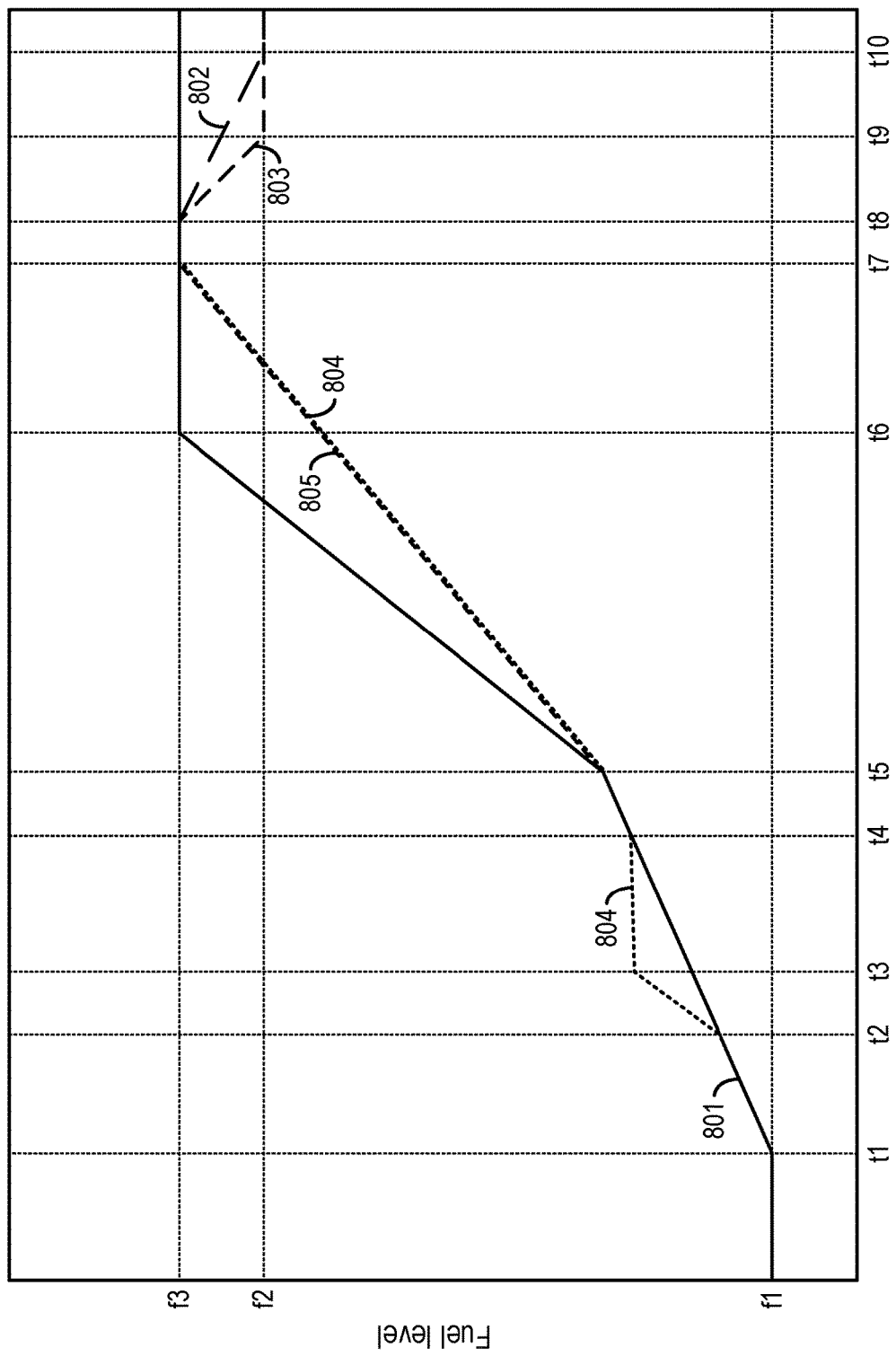
FIG. 8 shows a plot illustrating fuel levels of five exemplary fuel tanks before, during, and after an exemplary refueling event.

Referring now to FIG. 8, an example plot 800 showing fuel levels of five fuel tanks before, during, and after an exemplary refueling event is depicted. Therein, an abscissa represents time and an ordinate represents a fuel level of each respective fuel tank. Further, each of the five fuel tanks may include a respective bellows therein. When undegraded, each of the bellows may be configured to maintain a fuel vapor pressure within the respective fuel tank within a threshold range of a predetermined pressure, such as an ambient pressure of a surrounding environment.

A fueling curve 801 indicates a first fuel level of a first fuel tank, the first fuel tank including a first bellows in an undegraded state (e.g., with no leaks or ruptures). As shown, prior to t1, the first fuel level of the first fuel tank may be constant at f1. At t1, a refueling event begins, where fuel may be supplied to the first fuel tank at a constant rate. Accordingly, the first fuel level indicated by fueling curve 801 may increase with a first slope between t1 and t5. Further, upon rising fuel contacting the first bellows (e.g., at t2), the first bellows may compress proportionally with the increasing first fuel level.

At t5, the first bellows may reach a maximally compressed configuration, and the first fuel level may begin increasing with a second slope greater than the first slope, as the (maximally compressed) first bellows may occupy a portion of a remaining volume within the first fuel tank available to be filled. The first fuel level may continue to increase until reaching f3 at t6, where the refueling event is completed. After t6, the first fuel level may remain constant at f3 until further fuel is supplied in a subsequent refueling event, or until fuel is pumped to an engine coupled to the first fuel tank for combustion.

A fuel level of a given fuel tank including a bellows which deviates from fueling curve 801 may indicate that the bellows is in a degraded state (e.g., having a leak). Further, a size and/or a relative location of the leak in the bellows may be inferred from specific nuances in the deviations from fueling curve 801. As examples, fueling curves 802, 803, 804, and 805 respectively correspond to fuel tanks including degraded bellows. Unless otherwise shown or described, fueling curves 802, 803, 804, and 805 may be assumed to overlap with fueling curve 801; as such, only deviations of fueling curves 802, 803, 804, and 805 from fueling curve 801 will be described below.

Specifically, fueling curve 802 indicates a second fuel level of a second fuel tank, the second fuel tank including a second bellows in a degraded state wherein a small leak is present in a side of the second bellows. Fueling curve 802 may follow fueling curve 801 until t8, during which time the second fuel level may rise above the small leak in the side of the second bellows. However, at t8, the small leak in the side of the second bellows may be overwhelmed by a pressure from the surrounding fuel and may admit at least some fuel. Accordingly, between t8 and t10, the second fuel level may decrease from f3 to f2 at a constant third slope until either the pressure from the surrounding fuel has decreased to a point at which the small leak in the side of the second bellows no longer admits fuel or until a fuel level within the second bellows matches the second fuel level within the second fuel tank.

Fueling curve 803 indicates a third fuel level of a third fuel tank, the third fuel tank including a third bellows in a degraded state wherein a small leak is present in a base of the third bellows. Fueling curve 803 may follow fueling curve 801 until t8, during which time the third fuel level may rise above the small leak in the base of the third bellows. However, at t8, the small leak in the base of the third bellows may be overwhelmed by a pressure from the surrounding fuel and may admit at least some fuel. Accordingly, between t8 and t9, the third fuel level may decrease from f3 to f2 at a constant fourth slope until either the pressure from the surrounding fuel has decreased to a point at which the small leak in the base of the third bellows no longer admits fuel or until a fuel level within the third bellows matches the third fuel level within the third fuel tank. Notably, the fourth slope of fueling curve 803 may be greater than the third slope of fueling curve 802, as the small leak of the third bellows is in the base thereof, which is lower than the small leak in the second bellows (in the side thereof) and therefore subjected to a greater pressure from the surrounding fuel.

Fueling curve 804 indicates a fourth fuel level of a fourth fuel tank, the fourth fuel tank including a fourth bellows in a degraded state wherein a large leak is present in a side of the fourth bellows. Fueling curve 804 may follow fueling curve 801 until t2, where the fourth fuel level may reach a base of the fourth bellows. Since an interior space of the fourth bellows may be fluidically coupled with a remaining volume of the fourth fuel tank available to be filled, the fourth bellows may not substantially compress. Accordingly, between t2 and t3, the fourth fuel level may increase at a fifth slope greater than the first slope, as the (uncompressed) fourth bellows may occupy a portion of the remaining volume within the fourth fuel tank available to be filled.

At t3, the fourth fuel level may rise up to the large leak in the side of the fourth bellows, and fuel may begin entering into the fourth bellows via the large leak. Accordingly, between t3, and t4, the fourth fuel level may increase particularly slowly (at a sixth slope lower than either the first slope or the fifth slope), as most fuel entering the fourth fuel tank may flow into the fourth bellows via the large leak. At t4, however, a rate of fuel entering the fourth bellows may equilibrate with a rate of fuel entering the fourth fuel tank, such that the fourth fuel level within the fourth fuel tank may again increase according to the first slope.

At t5, where an undegraded bellows would be in the maximally compressed configuration, the fourth bellows may remain uncompressed and fluidically coupled to the fourth fuel tank via the large leak, such that the fourth fuel level may continue to increase according to the first slope. Accordingly, a duration of the refueling event may take longer relative to fueling curve 801, as the fourth fuel level may be increasing more slowly to f3 (according to the first slope instead of the greater second slope). Specifically, the refueling event corresponding to fueling curve 804 may complete at t7, which is shown as being later than t6 along the abscissa.

Fueling curve 805 indicates a fifth fuel level of a fifth fuel tank, the fifth fuel tank including a fifth bellows in a degraded state wherein a large leak is present in a base of the fifth bellows. Fueling curve 805 may follow fueling curve 801 until t5, where an undegraded bellows would be in the maximally compressed configuration. However, prior to t5 at t2, the fifth fuel level may rise up to the large leak in the base of the fifth bellows and fuel may begin entering into the fifth bellows via the large leak. Since the large leak is in the base of the fifth bellows instead of the side (as in the fourth bellows), the fifth fuel level may continue to increase according to the first slope even when the fifth fuel level reaches the base of the fifth bellows.

Accordingly, the fifth bellows may remain uncompressed and fluidically coupled to the fifth fuel tank via the large leak after t2 and past t5. A duration of the refueling event may therefore take longer relative to fueling curve 801, as the fifth fuel level may be increasing more slowly to f3 (according to the first slope instead of the greater second slope). Specifically, the refueling event corresponding to fueling curve 805 may complete at t7, which is shown as being later than t6 along the abscissa.

In this way, systems and methods are provided for detecting degradation of a fuel tank and a bellows of a fuel system. In one example, the bellows may be disposed within the fuel tank and in fluidic communication with the atmosphere. The bellows may be configured to compress during filling of the fuel tank and expand while fuel is pumped to an engine coupled to the fuel system. As such, a fuel vapor pressure of the fuel tank may be maintained at or near atmospheric pressure when no leaks are present in the bellows. To passively detect leaks in the bellows, each of a fuel level of the fuel tank and a rate at which fuel is supplied to the fuel system may be monitored during refueling of the fuel system. A technical effect of monitoring the fuel level and the rate at which the fuel is supplied during refueling is that an actual fueling curve may be constructed and analyzed for deviations from an expected fueling curve, the deviations indicative of degradation to the bellows or the fuel tank. By further considering deviations in fuel economy following the refueling event, a determination may be made as to whether the bellows or the fuel tank is degraded. In some examples, nuances in the deviations may be analyzed to identify a size and a location of a leak. Accordingly, degradation states of the fuel tank and the bellows may be diagnosed without actively altering fuel system operation or implementing specialized sensors or actuators.

In one example, a method, comprising: upon initiation of refueling of a vehicle fuel tank, monitoring a fuel level in the vehicle fuel tank through completion of the refueling; and indicating degradation of a bellows coupled to the vehicle fuel tank based on the monitored fuel level. A first example of the method further comprises determining a vehicle fuel economy following the completion of the refueling, wherein indicating the degradation of the bellows is further based on the determined vehicle fuel economy. A second example of the method, optionally including the first example of the method, further includes wherein indicating the degradation of the bellows based on the monitored fuel level comprises: determining a fueling curve by plotting the monitored fuel level against time; and comparing the fueling curve to an expected fueling curve, and wherein indicating the degradation of the bellows is responsive to the fueling curve deviating from the expected fueling curve. A third example of the method, optionally including one or more of the first and second examples of the method, further comprises determining a rate of fuel supplied to the vehicle fuel tank during the refueling, and wherein the expected fueling curve comprises a plot of an expected fuel level over time for the determined rate of fuel supplied. A fourth example of the method, optionally including one or more of the first through third examples of the method, further includes wherein the fueling curve deviating from the expected fueling curve comprises the monitored fuel level being less than the expected fuel level for at least a portion of the refueling.

In another example, a system, comprising: a fuel tank; a bellows disposed within the fuel tank, the bellows configured to maintain a fuel vapor pressure of the fuel tank within a threshold range of an ambient pressure of a surrounding environment; a fuel level sensor disposed within the fuel tank; and a controller storing instructions in non-transitory memory, the instructions executable to: monitor a fuel level of the fuel tank during a refueling event based on feedback from the fuel level sensor; and responsive to generating an indication of a leak in the bellows, determine one or more of a location of the leak in the bellows and a size of the leak in the bellows based on the monitored fuel level. A first example of the system further includes wherein the instructions are further executable to, responsive to detecting a deviation of the monitored fuel level from an expected fuel level of the fuel tank, generate the indication of the leak in the bellows. A second example of the system, optionally including the first example of the system, further includes wherein the controller is communicably coupled to an external fuel pump via a wireless network, the external fuel pump operable to dispense fuel in the fuel tank, and wherein the instructions are further executable to: receive, via the wireless network, a signal indicative of a rate of fueling during the refueling event from the external fuel pump; and determine the expected fuel level based on the received signal. A third example of the system, optionally including one or more of the first and second examples of the system, further includes wherein the instructions are further executable to determine a fuel economy over a duration, the duration beginning after or upon completion of the refueling event and terminating before or upon initiation of a subsequent refueling event, and wherein the indication of the leak in the bellows is generated further responsive to the determined fuel economy being greater than or equal to a threshold fuel economy. A fourth example of the system, optionally including one or more of the first through third examples of the system, further includes wherein the instructions are further executable to, responsive to each of detecting the deviation of the monitored fuel level from the expected fuel level and the determined fuel economy being less than the threshold fuel economy, generate an indication of a leak in the fuel tank. A fifth example of the system, optionally including one or more of the first through fourth examples of the system, further includes wherein the instructions are further executable to: continue monitoring the fuel level following the refueling event; and responsive to generating the indication of the leak in the fuel tank: responsive to detecting an apparent fuel loss during the refueling event, determine a size of the leak in the fuel tank to be in a large size range; and responsive to no apparent fuel loss being detected during the refueling event and further responsive to detecting the apparent fuel loss following the refueling event, determine the size of the leak in the fuel tank to be in a small size range, the small size range being smaller than and not overlapping with the large size range, and wherein detecting the deviation of the monitored fuel level from the expected fuel level comprises detecting the apparent fuel loss. A sixth example of the system, optionally including one or more of the first through fifth examples of the system, further includes wherein the instructions are further executable to continue monitoring the fuel level following the refueling event, wherein determining the one or more of the location of the leak in the bellows and the size of the leak in the bellows based on the monitored fuel level comprises determining the size of the leak in the bellows based on the monitored fuel level, wherein determining the size of the leak in the bellows based on the monitored fuel level comprises: responsive to detecting an apparent fuel loss during the refueling event, determining the size of the leak in the bellows to be in a large size range; and responsive to no apparent fuel loss being detected during the refueling event and further responsive to detecting the apparent fuel loss following the refueling event, determining the size of the leak in the bellows to be in a small size range, the small size range being smaller than and not overlapping with the large size range, and wherein detecting the deviation of the monitored fuel level from the expected fuel level comprises detecting the apparent fuel loss. A seventh example of the system, optionally including one or more of the first through sixth examples of the system, further includes wherein determining the one or more of the location of the leak in the bellows and the size of the leak in the bellows based on the monitored fuel level further comprises determining the location of the leak in the bellows based on the monitored fuel level, and wherein determining the location of the leak in the bellows based on the monitored fuel level comprises: responsive to the size of the leak in the bellows being determined to be in the small size range and a rate of the apparent fuel loss being less than a threshold rate, determining the location of the leak in the bellows to be in a side of the bellows; and responsive to the size of the leak in the bellows being determined to be in the small size range and the rate of the apparent fuel loss being greater than or equal to the threshold rate, determining the location of the leak in the bellows to be in a base of the bellows. An eighth example of the system, optionally including one or more of the first through seventh examples of the system, further includes wherein determining the one or more of the location of the leak in the bellows and the size of the leak in the bellows based on the monitored fuel level further comprises determining the location of the leak in the bellows based on the monitored fuel level, and wherein determining the location of the leak in the bellows based on the monitored fuel level comprises: responsive to the size of the leak in the bellows being determined to be in the large size range and the monitored fuel level matching the expected fuel level of the fuel tank during the refueling event and prior to a maximal compression of the bellows, determining the location of the leak in the bellows to be in a base of the bellows; and responsive to the size of the leak in the bellows being determined to be in the large size range and detecting the deviation of the monitored fuel level from the expected fuel level of the fuel tank during the refueling event and prior to the maximal compression of the bellows, determining the location of the leak in the bellows to be in a side of the bellows. A ninth example of the system, optionally including one or more of the first through eighth examples of the system, further comprises a port fluidically coupling the bellows to the surrounding environment.

In yet another example, a method for a vehicle, the method comprising, following refueling of a fuel tank of the vehicle: determining, for a duration of the refueling, an actual fuel level of the fuel tank and an expected fuel level of the fuel tank; and identifying a leak in the fuel tank or a bellows coupled to the fuel tank responsive to the actual fuel level deviating from the expected fuel level, the bellows configured to maintain a fuel vapor pressure of the fuel tank within a predetermined range. A first example of the method further comprises responsive to the leak being identified and the duration of the refueling lasting longer than expected, inferring a size of the leak to be greater than or equal to a threshold size; and responsive to the leak being identified and the duration of the refueling lasting for as long as expected, inferring the size of the leak to be less than the threshold size. A second example of the method, optionally including the first example of the method, further comprises, following the refueling, determining a fuel economy of the vehicle, wherein the leak is identified in the bellows responsive to the fuel economy being greater than or equal to a threshold fuel economy, and wherein the leak is identified in the fuel tank responsive to the fuel economy being less than the threshold fuel economy. A third example of the method, optionally including one or more of the first and second examples of the method, further comprises, after identifying the leak, displaying a notification to an operator of the vehicle indicating a presence of the leak. A fourth example of the method, optionally including one or more of the first through third examples of the method, further comprises, after identifying the leak, altering one or more vehicle operating conditions to reduce excess fuel vapors in the fuel tank, wherein altering the one or more vehicle operating conditions comprises one or more of: altering one or more of an engine speed and an engine load; and entering an electric drive mode of the vehicle.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   upon initiation of refueling of a vehicle fuel tank, monitoring a fuel level in the vehicle fuel tank through completion of the refueling; and
   indicating degradation of a bellows coupled to the vehicle fuel tank based on the monitored fuel level.

2. The method of claim 1, further comprising determining a vehicle fuel economy following the completion of the refueling,
   wherein indicating the degradation of the bellows is further based on the determined vehicle fuel economy.

3. The method of claim 1, wherein indicating the degradation of the bellows based on the monitored fuel level comprises:
   determining a fueling curve by plotting the monitored fuel level against time; and
   comparing the fueling curve to an expected fueling curve, and
   wherein indicating the degradation of the bellows is responsive to the fueling curve deviating from the expected fueling curve.

4. The method of claim 3, further comprising determining a rate of fuel supplied to the vehicle fuel tank during the refueling, and
   wherein the expected fueling curve comprises a plot of an expected fuel level over time for the determined rate of fuel supplied.

5. The method of claim 4, wherein the fueling curve deviating from the expected fueling curve comprises the monitored fuel level being less than the expected fuel level for at least a portion of the refueling.

6. A system, comprising:
   a fuel tank;
   a bellows disposed within the fuel tank, the bellows configured to maintain a fuel vapor pressure of the fuel tank within a threshold range of an ambient pressure of a surrounding environment;
   a fuel level sensor disposed within the fuel tank; and
   a controller storing instructions in non-transitory memory, the instructions executable to:

monitor a fuel level of the fuel tank during a refueling event based on feedback from the fuel level sensor; and responsive to generating an indication of a leak in the bellows, determine one or more of a location of the leak in the bellows and a size of the leak in the bellows based on the monitored fuel level.

7. The system of claim 6, wherein the instructions are further executable to, responsive to detecting a deviation of the monitored fuel level from an expected fuel level of the fuel tank, generate the indication of the leak in the bellows.

8. The system of claim 7, wherein the controller is communicably coupled to an external fuel pump via a wireless network, the external fuel pump operable to dispense fuel in the fuel tank, and wherein the instructions are further executable to:
receive, via the wireless network, a signal indicative of a rate of fueling during the refueling event from the external fuel pump; and
determine the expected fuel level based on the received signal.

9. The system of claim 7, wherein the instructions are further executable to determine a fuel economy over a duration, the duration beginning after or upon completion of the refueling event and terminating before or upon initiation of a subsequent refueling event, and wherein the indication of the leak in the bellows is generated further responsive to the determined fuel economy being greater than or equal to a threshold fuel economy.

10. The system of claim 9, wherein the instructions are further executable to, responsive to each of detecting the deviation of the monitored fuel level from the expected fuel level and the determined fuel economy being less than the threshold fuel economy, generate an indication of a leak in the fuel tank.

11. The system of claim 10, wherein the instructions are further executable to:

continue monitoring the fuel level following the refueling event; and responsive to generating the indication of the leak in the fuel tank:

responsive to detecting an apparent fuel loss during the refueling event, determine a size of the leak in the fuel tank to be in a large size range; and responsive to no apparent fuel loss being detected during the refueling event and further responsive to detecting the apparent fuel loss following the refueling event, determine the size of the leak in the fuel tank to be in a small size range, the small size range being smaller than and not overlapping with the large size range, and wherein detecting the deviation of the monitored fuel level from the expected fuel level comprises detecting the apparent fuel loss.

12. The system of claim 7, wherein the instructions are further executable to continue monitoring the fuel level following the refueling event, wherein determining the one or more of the location of the leak in the bellows and the size of the leak in the bellows based on the monitored fuel level comprises determining the size of the leak in the bellows based on the monitored fuel level, wherein determining the size of the leak in the bellows based on the monitored fuel level comprises:

responsive to detecting an apparent fuel loss during the refueling event, determining the size of the leak in the bellows to be in a large size range; and responsive to no apparent fuel loss being detected during the refueling event and further responsive to detecting the apparent fuel loss following the refueling event, determining the size of the leak in the bellows to be in a small size range, the small size range being smaller than and not overlapping with the large size range, and wherein detecting the deviation of the monitored fuel level from the expected fuel level comprises detecting the apparent fuel loss.

13. The system of claim 12, wherein determining the one or more of the location of the leak in the bellows and the size of the leak in the bellows based on the monitored fuel level further comprises determining the location of the leak in the bellows based on the monitored fuel level, and wherein determining the location of the leak in the bellows based on the monitored fuel level comprises:

responsive to the size of the leak in the bellows being determined to be in the small size range and a rate of the apparent fuel loss being less than a threshold rate, determining the location of the leak in the bellows to be in a side of the bellows; and responsive to the size of the leak in the bellows being determined to be in the small size range and the rate of the apparent fuel loss being greater than or equal to the threshold rate, determining the location of the leak in the bellows to be in a base of the bellows.

14. The system of claim 12, wherein determining the one or more of the location of the leak in the bellows and the size of the leak in the bellows based on the monitored fuel level further comprises determining the location of the leak in the bellows based on the monitored fuel level, and wherein determining the location of the leak in the bellows based on the monitored fuel level comprises:

responsive to the size of the leak in the bellows being determined to be in the large size range and the monitored fuel level matching the expected fuel level of the fuel tank during the refueling event and prior to a maximal compression of the bellows, determining the location of the leak in the bellows to be in a base of the bellows; and responsive to the size of the leak in the bellows being determined to be in the large size range and detecting the deviation of the monitored fuel level from the expected fuel level of the fuel tank during the refueling event and prior to the maximal compression of the bellows, determining the location of the leak in the bellows to be in a side of the bellows.

15. The system of claim 6, further comprising a port fluidically coupling the bellows to the surrounding environment.

16. A method for a vehicle, the method comprising, following refueling of a fuel tank of the vehicle:

determining, for a duration of the refueling, an actual fuel level of the fuel tank and an expected fuel level of the fuel tank; and identifying a leak in the fuel tank or a bellows coupled to the fuel tank responsive to the actual fuel level deviating from the expected fuel level, the bellows configured to maintain a fuel vapor pressure of the fuel tank within a predetermined range.

17. The method of claim 16, further comprising:
responsive to the leak being identified and the duration of the refueling lasting longer than expected, inferring a size of the leak to be greater than or equal to a threshold size; and
responsive to the leak being identified and the duration of the refueling lasting for as long as expected, inferring the size of the leak to be less than the threshold size.

18. The method of claim 16, further comprising, following the refueling, determining a fuel economy of the vehicle,
wherein the leak is identified in the bellows responsive to the fuel economy being greater than or equal to a threshold fuel economy, and
wherein the leak is identified in the fuel tank responsive to the fuel economy being less than the threshold fuel economy.

19. The method of claim 16, further comprising, after identifying the leak, displaying a notification to an operator of the vehicle indicating a presence of the leak.

20. The method of claim 16, further comprising, after identifying the leak, altering one or more vehicle operating conditions to reduce excess fuel vapors in the fuel tank,
wherein altering the one or more vehicle operating conditions comprises one or more of:
altering one or more of an engine speed and an engine load; and
entering an electric drive mode of the vehicle.

\* \* \* \* \*